US011798340B1

(12) United States Patent
Xu

(10) Patent No.: US 11,798,340 B1
(45) Date of Patent: Oct. 24, 2023

(54) SENSOR FOR ACCESS CONTROL READER FOR ANTI-TAILGATING APPLICATIONS

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 226 days.

(21) Appl. No.: 17/324,605

(22) Filed: May 19, 2021

(51) Int. Cl.
*G06V 20/52* (2022.01)
*G06V 20/10* (2022.01)
*G06V 40/10* (2022.01)
*G07C 9/30* (2020.01)
*G06V 20/40* (2022.01)
*G07C 9/15* (2020.01)

(52) U.S. Cl.
CPC .............. *G07C 9/30* (2020.01); *G06V 20/41* (2022.01); *G06V 20/52* (2022.01); *G06V 40/10* (2022.01); *G07C 9/15* (2020.01)

(58) Field of Classification Search
None
See application file for complete search history.

(56) References Cited

U.S. PATENT DOCUMENTS

| 2021/0034671 A1* | 2/2021 | Lemay | G06F 16/907 |
| 2021/0166514 A1* | 6/2021 | Boyes | G07C 9/00563 |
| 2021/0287469 A1* | 9/2021 | Ryhorchuk | G06V 40/172 |
| 2021/0335071 A1* | 10/2021 | Nam | G06V 20/52 |

* cited by examiner

*Primary Examiner* — Samuel D Fereja
(74) *Attorney, Agent, or Firm* — Christopher P. Maiorana, PC

(57) ABSTRACT

An apparatus includes an interface and a processor. The interface may be configured to receive pixel data corresponding to an entrance of a secured area. The processor may be configured to process the pixel data arranged as video frames, perform computer vision operations to detect objects, extract characteristics about the objects, determine a number of people in the video frames, receive an authorization signal from an access control device and generate a control signal. The authorization signal may be used by the access control device to grant access to the secured area. The number of people in the video frames may be determined after the authorization signal is received. The control signal may be generated when the number of people is greater than a number of entrants permitted by the authorization signal. The control signal may provide an indication of unauthorized access to the secured area.

20 Claims, 12 Drawing Sheets

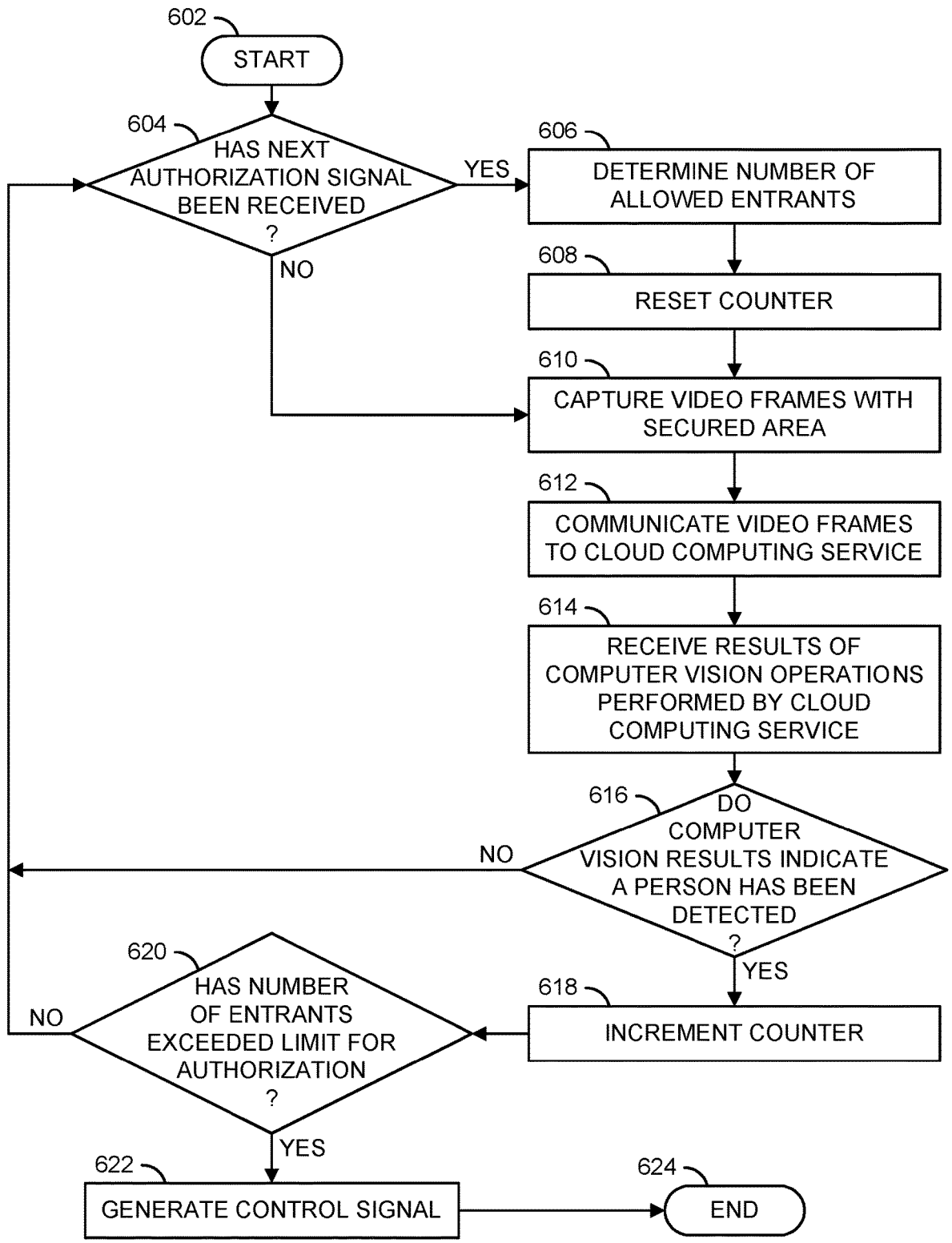

SENSOR FOR ACCESS CONTROL READER FOR ANTI-TAILGATING APPLICATIONS

FIELD OF THE INVENTION

The invention relates to security devices generally and, more particularly, to a method and/or apparatus for implementing a sensor for access control reader for anti-tailgating applications.

BACKGROUND

Various strategies and technology are used to ensure security. Security personnel, turnstiles, physical access control devices (i.e., scannable ID cards, security codes, fingerprint scanners, etc.), and keys can be used to prevent unauthorized people from entering a secured area. However, one low-tech strategy of tailgating can be used to defeat various security measures. One person simply follows closely behind a person that does have access to the secure area to gain unauthorized access. Tailgating can be done with or without knowledge of the person that does have secure access.

Some estimates have tailgating accounting for 40-50% of unauthorized entrances. Tailgating is a key security risk in physical access control applications. Adding imaging (i.e., surveillance camera) capability into the access control reader is still subject to many different challenges. Monitoring of footage captured by a surveillance camera is reliant on a person paying attention in real-time or detection algorithms operating in real-time. Surveillance camera footage can be reviewed at a later time to find who had unauthorized access, but post-incident identification does not prevent the unauthorized access. If a camera is integrated as part of a physical access control reader, detection algorithms are limited because physical access control readers are typically mounted on the wall on the side of a door. The detection algorithm implemented on a physical access reader can have difficulty judging a person immediately following an authorized user who just gained access to enter the secured facility/area. The resolution of the camera on the reader is subject to more distortions at the edge, which has impacts on the accuracy of the detection algorithm. It would be desirable to implement a sensor for access control reader for anti-tailgating applications.

SUMMARY

The invention concerns an apparatus comprising an interface and a processor. The interface may be configured to receive pixel data corresponding to an entrance of a secured area. The processor may be configured to process the pixel data arranged as video frames, perform computer vision operations to detect objects in the video frames, extract characteristics about the objects detected, determine a number of people in the video frames based on the characteristics extracted, receive an authorization signal from an access control device and generate a control signal. The authorization signal may be used by the access control device to grant access to the secured area. The number of people in the video frames may be determined after the authorization signal is received. The control signal may be generated when the number of people is greater than a number of entrants permitted into the secured area by the authorization signal. The control signal may provide an indication of unauthorized access to the secured area.

BRIEF DESCRIPTION OF THE FIGURES

Embodiments of the invention will be apparent from the following detailed description and the appended claims and drawings.

FIG. 12 is a flow diagram illustrating a method for detecting entrants that have entered the secured area.

DETAILED DESCRIPTION OF THE EMBODIMENTS

Figure 1:
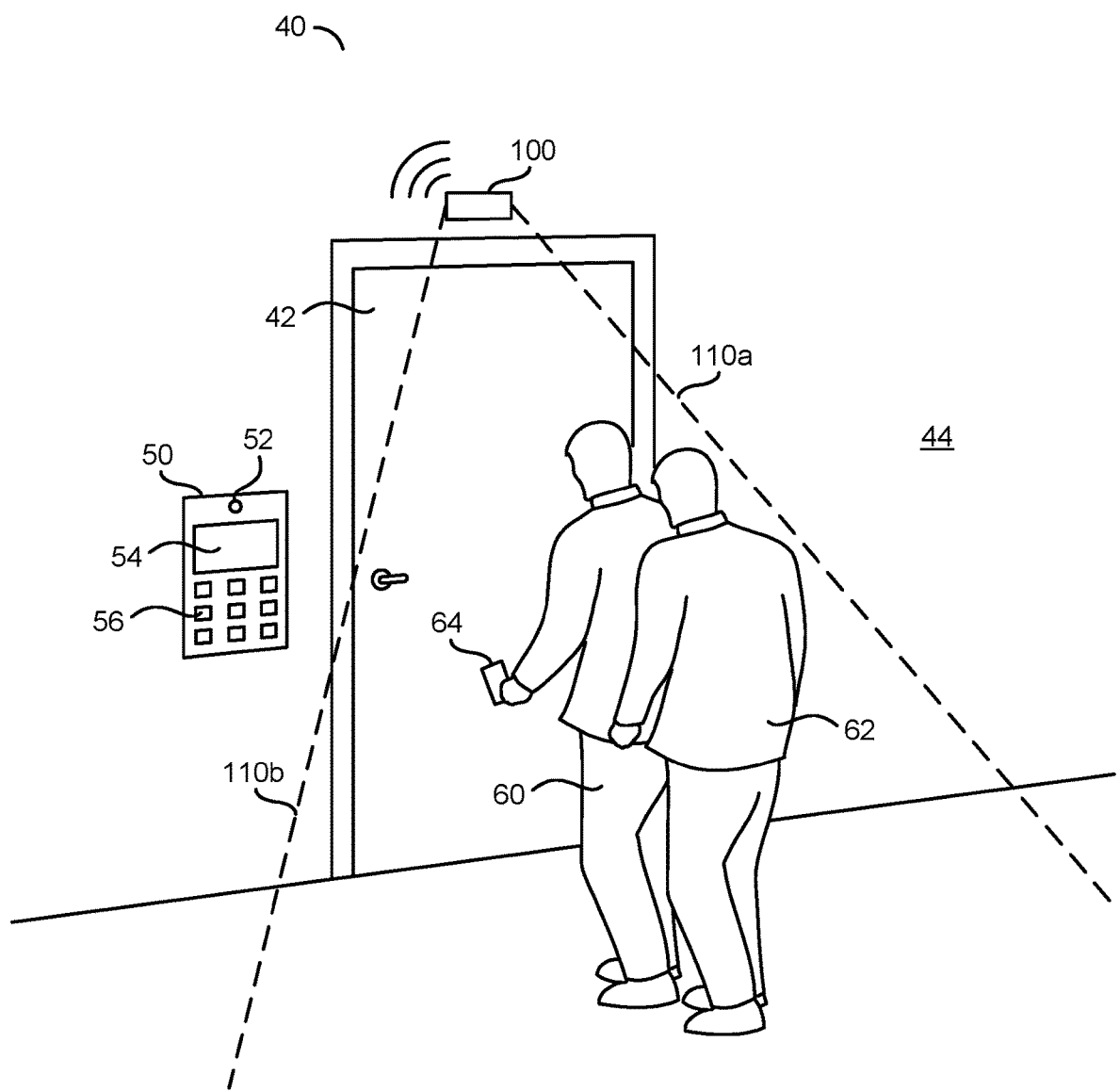
FIG. 1 is a diagram illustrating an example embodiment of the present invention.

Embodiments of the present invention include providing a sensor for access control reader for anti-tailgating applications that may (i) be mounted over a doorway that provides access to a secured area, (ii) perform computer vision operations to detect tailgating, (iii) implement a neural network to perform computer vision locally, (iv) operate as a companion device to a physical access control reader, (v) detect people using a time-of-flight sensor, (vi) determine a number of people entering a secured area after physical access has been granted, (vii) report detected tailgating events and/or (viii) be implemented as one or more integrated circuits.

Embodiments of the present invention may be configured to guard against unauthorized users tailgating to gain access to a secured area. Access to the secured area may be permitted using an access control device (e.g., a physical access control reader). The access control device may grant access to the secured area to one or more people at a time. After access has been granted, the present invention may detect unauthorized access to the secured area by searching for anybody attempting to tailgate (e.g., closely follow behind) a permitted user.

Computer vision may be implemented to distinguish between multiple people in captured video frames. Descriptors calculated from feature points extracted from the video frames by analyzing pixel data may be compared to reference descriptors to detect objects, determine which objects correspond to people and distinguish each person in the video frames. A number of people attempting to enter the secured area may be determined. The access control device may generate an authorization signal that indicates when a person (or people) has been permitted access to the secured area. After the authorization signal is detected, the computer vision may be used to determine whether the number of people that actually entered the secured area matches the number of people permitted by the authorization signal. The number of people in the video frames may be determined after the authorization signal has been received. A control signal may be generated when unauthorized access has been detected.

Embodiments of the present invention may be configured as a plug-in sensor/camera peripheral, which may be mounted overhead (e.g., above a door), for an access control reader. The plug-in feature may enable computer vision capabilities to be added to the access control reader to guard against tailgating. In some embodiments, the present invention may be mounted at another location that captures the access control reader and/or the door to the secured area in a field of view.

Embodiments of the present invention may be configured to run neural networks and/or other artificial intelligence models to determine the number of people near the access control reader. The input to the neural network may comprise images and/or a sequence of video frames captured. In one example, the images may be captured using an RGB Bayer pattern sensor. In another example, the images may be captured by an RGB-IR image sensors. In yet another example, the images may be captured by a time-of-flight sensor and/or another 3D sensing technology (e.g., disparity images). The type of data generated for analysis to detect the number of people may be varied according to the design criteria of a particular implementation.

Referring to FIG. 1, a diagram illustrating an example embodiment of the present invention is shown. A location 40 is shown. The location 40 may generally represent an unsecured area. The location 40 may comprise a door 42 and a wall 44. The door 42 may provide an entrance through the wall 44. On the other side of the door 42 and the wall 44 may be a secured area. In the example shown, the door 42 may be closed. The secured area may not be visible (e.g., the door 42 may be closed, obscuring a view of the secured area, and the wall 44 may block off the secured area).

An access control device 50 is shown. The access control device 50 may be installed on the wall 44. The access control device 50 may be located beside the door 42. In an example, the access control device 50 may be at approximately chest or arm level beside the door 42 (e.g., generally at a height near a doorknob or door handle of the door 42). The access control device 50 may be configured to provide secure access to the secured area. In the example shown, the door 42 may be locked to deny access to the secured area. The access control device 50 may be configured to lock and unlock the door 42.

The access control device 50 may be configured to permit access to the secured area in response to approved (or authorized) credentials. The access control device 50 may be configured to read credentials, compare the credentials to a database of authorized users and determine whether the credentials match one of the authorized users. If the credentials do not match, then the access control device 50 may not enable access to the secured area. If the credentials do match, then the access control device 50 may enable access to the secured area. In the example shown, the access control device 50 may be configured to unlock the door 42 if approved credentials are provided (e.g., detected by the access control device 50).

The access control device 50 is shown comprising a sensor 52, a display 54 and/or a keypad 56. The sensor 52 may be configured to read input. In one example, the sensor 52 may comprise a camera that may capture images. In some embodiments, the images may be used for access control for the secured area (e.g., facial recognition, retina scan, etc.). In some embodiments, the sensor 52 may capture images to store pictures of people who have entered or attempted to enter the secured area (e.g., an after-the-fact security check). In another example, the sensor 52 may comprise a fingerprint reader. In yet another example, the sensor 52 may comprise an RFID reader, magnetic scanner, a security chip reader, etc. The type of the sensor 52 may be varied according to the design criteria of a particular implementation.

The display 54 may be configured to provide an output. In an example, the display 54 may provide a welcome message and/or instructions for accessing the secured area (e.g., instructions to enter a security code, instructions to swipe an ID card, instructions for scanning a fingerprint, etc.). The display 54 may provide an indication of whether access to the secured area has been granted or denied.

The keypad 56 may be configured to receive input from a user. In an example, the keypad 56 may be configured to enable a user to input a security code and the access control device 50 may compare the code input to a stored authorization code. The access control device 50 may be implemented with or without the sensor 52, the display 54 and/or the keypad 56.

Generally, the access control device 50 may be configured to receive an input to determine whether or not to allow access to the secured area. When access is granted, the access control device 50 may generate an authorization signal. The authorization signal may indicate that authorization has been granted to the secured area. In one example, the authorization signal may be used to unlock the door 42.

A person 60 and a person 62 are shown. The person 60 may provide an input to the access control device 50 and the access control device 50 may determine whether the person 60 is authorized to enter the secured area. If the person 60 is not authorized, the door 42 may remain locked. If the person 60 is authorized, the access control device 50 may generate an authorization signal to unlock the door 42.

The person 62 may be following closely behind the person 60. The person 62 following closely behind the person 60 may be an example of tailgating. If the person 62 is attempting legitimate access to the secured area, the person 62 may wait for the person 60 to enter the secured area, then the person 62 may provide credentials to the access control device 50 and the access control device 50 may enable the person 62 to have access to the secured area. If the person 62 is attempting an illegitimate access to the secured area, then the person 62 may wait for the person 60 to receive authorized access and then follow the person 60 into the secured area (e.g., bypassing interacting with the access control device 50 and illegitimately using the authorized credentials of the person 60 to gain access).

The person 60 is shown holding credentials 64. The credentials 64 may be used by the person 60 as an input to the access control device 50. In an example, the credentials 64 may comprise an ID badge/card that may be scanned by the sensor 52. The access control device 50 may be configured to scan the credentials 64 and if the credentials 64 are approved by the access control device 50, the access control device 50 may open the door 42 and/or generate the authorization signal. In the example shown, the credentials 64 may comprise badge/card. In some embodiments, the credentials 64 may be a biometric measurement performed by the sensor 52. In some embodiments, the credentials 64 may comprise a passcode that may be entered on the keypad 56. The type of the credentials 64 accepted by the access control device 50 may be varied according to the design criteria of a particular implementation.

In the example shown, the person 60 may be an authorized user and may be granted access to the secured area by the access control device 50 and the person 62 may be an unauthorized user that may attempt to gain access to the secured area by tailgating. The access control device 50 may not have functionality to prevent and/or detect the unauthorized person 62 from accessing the secured area. For example, a combination of the sensor 52, the display 54 and the keypad 56 alone may not be sufficient to prevent tailgating.

A camera system 100 is shown. The camera system 100 may be configured to generate pixel data of the environment, generate video frames from the pixel data, encode the video frames and/or perform computer vision analysis on the video frames. In some embodiments, the video frames generated by the camera system 100 may be stored locally (e.g., on a microSD card, to a local network attached storage device, etc.). In some embodiments, the video frames generated by the camera system 100 may be communicated to a remote device (e.g., packetized as a video stream).

The camera system 100 may be configured to detect events and/or objects. The camera system 100 may be configured to analyze pixel data arranged as video frames to detect people. The camera system 100 may be configured to determine the number of people that attempt to enter the secured area based on the people detected. The camera system 100 may be configured to compare the number of people that attempt to enter the secured area to determine whether there is an unauthorized person attempting to gain access to the secured area by tailgating.

In the example shown, the camera system 100 may be mounted above the door 42. Dotted lines 110a-110b are shown. The dotted lines 110a-110b may represent a field of view (FOV) of the camera system 100. The camera system 100 may capture pixel data and/or generate video frames of the area within the FOV 110a-110b. The FOV 110a-110b may comprise coverage of an entrance of the secured area. For example, the FOV 110a-110b may comprise an area near the door 42 and/or near the access control device 50. By mounting the camera system 100 at a high location (e.g., above the door 42), the perspective of the FOV 110a-110b may be directed at an angle that may facilitate distinguishing between multiple people. For example, an overhead perspective may enable the camera system 100 to detect a person that may be attempting to hide behind another person (e.g., hiding behind another person may be sufficient to hide from the sensor 52 mounted at chest/arm height beside the door 42).

The camera system 100 is shown communicating wirelessly. In some embodiments, the camera system 100 may communicate using a physical connection. For example, since the camera system 100 and the access control device 50 may be located next to the door 42, a wired connection may be implemented between the camera system 100 and the access control device 50. The access control device 50 may be configured to communicate the authorization signal to the camera system 100. The authorization signal may provide information about when the person 60 is attempting to access the secured area and/or how many people have been authorized to enter the secured area. In some embodiments, the camera system 100 may communicate the information extracted from the video frames using computer vision (e.g., results) to the access control device 50. In some embodiments, the camera system 100 may communicate the video frames generated of the FOV 110a-110b to the access control system 100. In some embodiments, the camera system 100 may be configured to communicate with a remote computing device (not shown). The communication between the access control device 50 and the camera system 100 may enable the camera system 100 to provide computer vision functionality (e.g., another source of information) that may be used to detect tailgating that would otherwise be unavailable to the access control device 50.

The camera system 100 may be configured to detect objects in the video frames, extract characteristics about the objects detected and/or determine a number of people in the video frames based on the characteristics extracted. The number of people in the video frames may be determined after the authorization signal is received by the camera system 100. The camera system 100 may be configured to determine whether there has been an unauthorized access to the secured area by comparing the number of people detected with the number of entrants permitted into the secured area by the authorization signal.

The camera system 100 may be configured to generate a control signal. The control signal may be generated in response to detecting a number of people in the video frames attempting to enter the secured area that is greater than the number of people permitted by the authorization signal. The control signal may provide an indication of unauthorized access to the secured area. In some embodiments, the control signal may be communicated to the access control device 50 and the access control device 50 may perform a security measure in response to the control signal. In some embodiments, the control signal may enable a security measure that may be performed by the camera system 100. In some embodiments, the control signal may be communicated to a remote device (not shown).

In the example shown, the camera system 100 may receive the authorization signal from the access control device 50 after the authorized person 60 provides the credentials 64 to the access control device 50. The authorization signal may indicate that one person has been permitted (e.g., allowed access) to enter the secured area. In response to the control signal, the camera system 100 may monitor the FOV 110a-110b to determine whether one person is detected entering the secured area. The camera system 100 may detect the person 60 and the person 62 attempting to tailgate the person 60. In response to detecting two people attempting to enter the secured area when only one person is permitted, the camera system 100 may generate the control signal.

Figure 2:
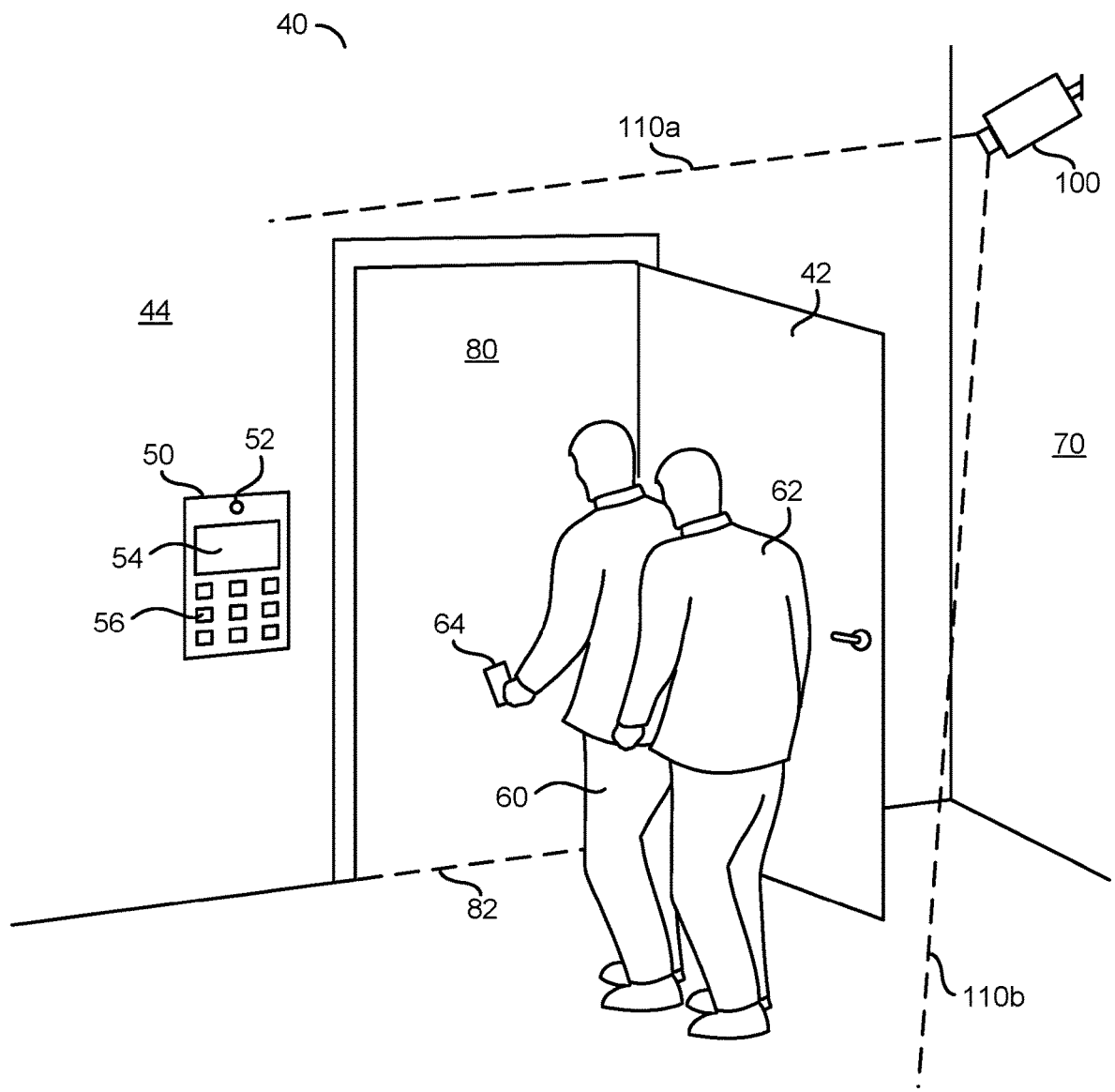
FIG. 2 is a diagram illustrating an alternate embodiment of the present invention.

Referring to FIG. 2, a diagram illustrating an alternate embodiment of the present invention is shown. An alternate example of the location 40 is shown. The door 42 is shown on the wall 44. The access control device 50 is shown on the wall 44 near the door 42. The unauthorized person 62 may be tailgating the authorized person 60. The person 60 is shown holding the credentials 64. The unauthorized person 62 is shown without credentials.

In the example shown, the camera system 100 may not be mounted directly above the door 42. The camera system 100 may be mounted on another wall 70 (e.g., at an overhead position). In the example shown, the door 42 may be opened. With the door 42 opened, the secured area 80 may be visible. A threshold 82 is shown. The threshold 82 may be a transition between the location 40 and the secured area 80. The threshold 82 may comprise a location where the door 42 closes.

When the camera system 100 is installed on the wall 70, the FOV 110a-110b may provide an alternate perspective compared the example shown in association with FIG. 1. The FOV 110a-110b may comprise coverage of the entrance to the secured area 80. The FOV 110a-110b may comprise a view of the door 42, a view of the access control device 50, the authorized user 60, the unauthorized (e.g., tailgating) user 62, a partial view of the secured area 80 and/or the threshold 82.

In some embodiments, the camera system 100 may be configured to perform the computer vision operations on the video frames captured of the FOV 110a-110b. The camera system 100 may be configured to detect the person 60 and/or the person 62 crossing the threshold 82 into the secured area 80. The camera system 100 may determine the number of people that entered the secured area 80 based on the number of people detected crossing the threshold 82.

By detecting the number of people that cross the threshold 82, the camera system 100 may distinguish between an innocent bystander (e.g., a person with no intention of entering the secured area 80 that may be within the FOV 110a-110b) and a person attempting to tailgate. Both the innocent bystander and a tailgater may be unauthorized to enter the secured area 80. However, generating the control signal in response to detecting the innocent bystander may be a false alarm. The innocent bystander (not shown) may be a person that may be merely walking in the location 40 (e.g., a narrow hallway) near the door 42 at the time when the authorized user 60 enters the secured area 80. The innocent bystander may be distinguished from a tailgater by the camera system 100 detecting which people cross the threshold 82 into the secured area 80. The innocent bystander may not be counted as the number of people attempting to enter the secured area 80 and the tailgater (e.g., the person 62 that attempts to cross the threshold 82) may be counted as the number of people attempting to enter the secured area 80.

In some embodiments, the camera system 100 may be configured to tally the number of people that enter and exit the secured area 80. The tally of the number of people may comprise a running total that may be incremented when a person enters the secured area 80 and decremented when a person exits the secured area 80. The running tally may enable the camera system 100 to determine a total number of people that may be currently within the secured area 80. The camera system 100 may be configured to generate the control signal in response to the total number of people in the secured area 80 being above a threshold amount of people (e.g., above a maximum capacity). In one example, determining the total number of people may enable the camera system 100 to ensure that the secured area 80 complies with various regulations (e.g., fire codes, pandemic protocols, weight limits, other capacity limitations, etc.). In another example, determining the total number of people may enable the camera system 100 to ensure that a correct number of people have entered the secured area 80 (e.g., the total number of people detected matches a number of tickets sold for an entertainment event). The types of events that use the tally of people and/or detect tailgating may be varied according to the design criteria of a particular implementation.

Figure 3:
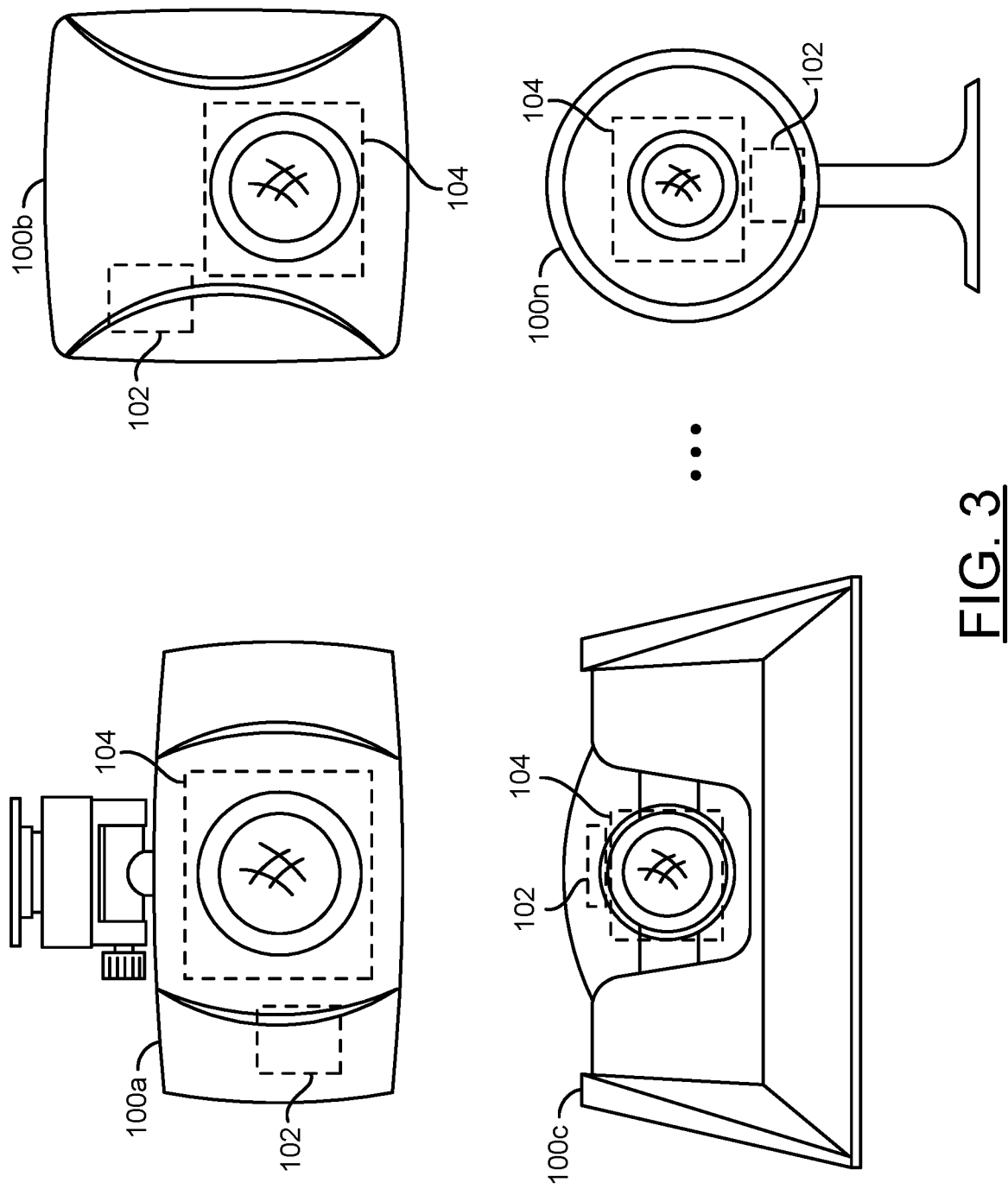
FIG. 3 is a diagram illustrating example security cameras implementing an example embodiment of the present invention.

Referring to FIG. 3, a diagram illustrating example security cameras implementing an example embodiment of the present invention is shown. Camera systems 100a-100n are shown. Each camera device 100a-100n may have a different style and/or use case. For example, the camera 100a may be an action camera, the camera 100b may be a ceiling mounted security camera, the camera 100n may be webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102 and/or a block (or circuit) 104. The circuit 102 may implement a processor. The circuit 104 may implement a capture device. The camera systems 100a-100n may comprise other components (not shown). Details of the components of the cameras 100a-100n may be described in association with FIG. 4.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), video encoding and/or video transcoding on-device. For example, even advanced processes such as computer vision may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

Figure 4:
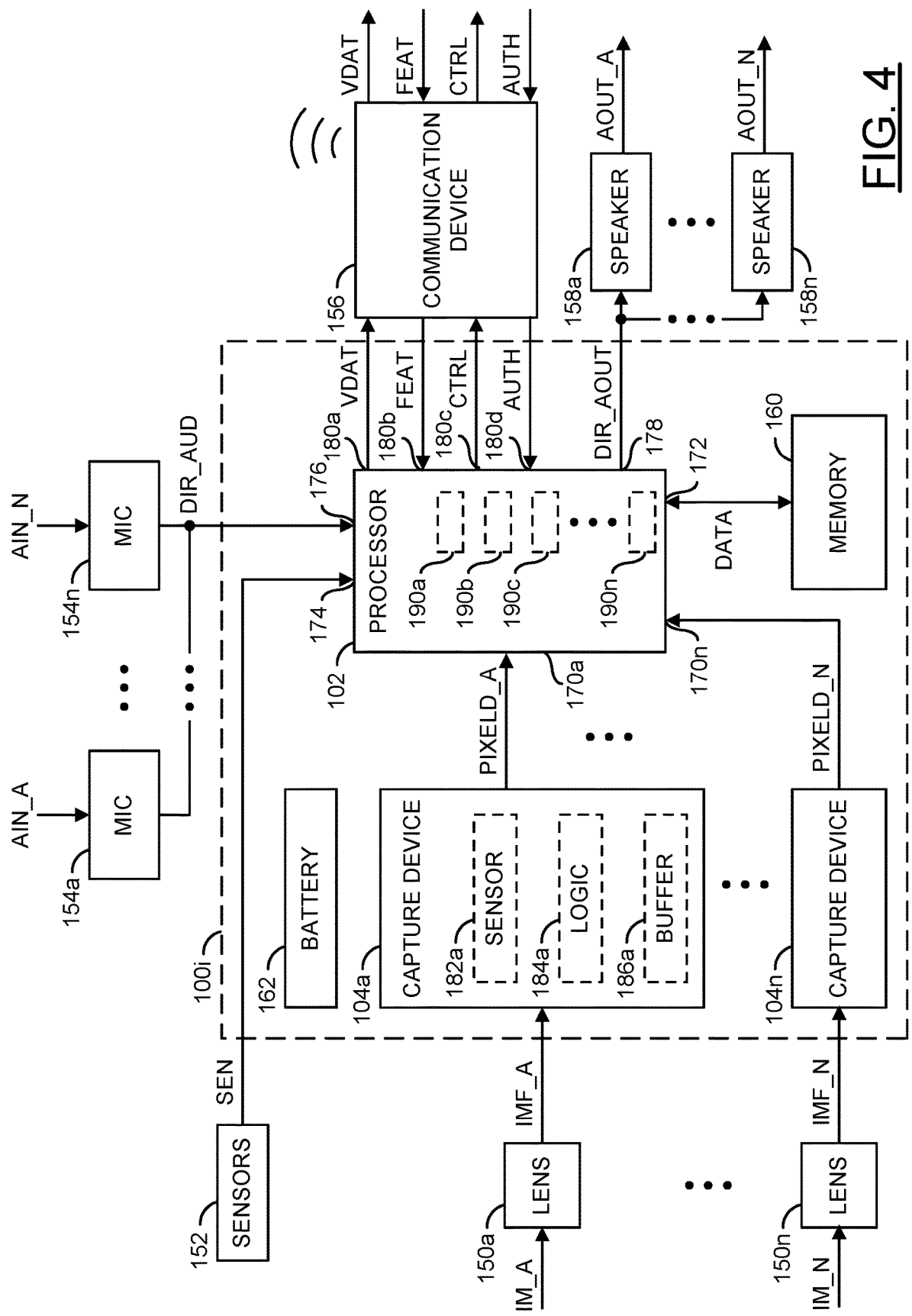
FIG. 4 is a block diagram illustrating components of an apparatus configured to provide anti-tailgating for access control.

Referring to FIG. 4, a block diagram illustrating components of an apparatus configured to provide anti-tailgating for access control is shown. A block diagram of the camera system 100i is shown. The camera system 100i may be a representative example of the camera system 100a-100n shown in association with FIGS. 1-3. The camera system 100i generally comprises the processor 102, the capture devices 104a-104n, blocks (or circuits) 150a-150n, a block (or circuit) 152, blocks (or circuits) 154a-154n, a block (or circuit) 156, blocks (or circuits) 158a-158n, a block (or circuit) 160 and/or a block (or circuit) 162. The blocks 150a-150n may implement lenses. The circuit 152 may implement sensors. The circuits 154a-154n may implement microphones (e.g., audio capture devices). The circuit 156 may implement a communication device. The circuits 158a-158n may implement audio output devices (e.g., speakers). The circuit 160 may implement a memory. The circuit 162 may implement a power supply (e.g., a battery). The camera system 100i may comprise other components (not shown). In the example shown, some of the components 150-158 are shown external to the camera system 100i. However, the components 150-158 may be implemented within and/or attached to the camera system 100i (e.g., the speakers 158a-158n may provide better functionality if not located inside a housing of the camera system 100*i*). The number, type and/or arrangement of the components of the camera system 100*i* may be varied according to the design criteria of a particular implementation.

In an example implementation, the processor 102 may be implemented as a video processor. The processor 102 may comprise inputs 170*a*-170*n* and/or other inputs. The processor 102 may comprise an input/output 172. The processor 102 may comprise an input 174 and an input 176. The processor 102 may comprise an output 178. The processor 102 may comprise an output 180*a*, an input 180*b*, an output 180*c* and an input 180*d*. The number of inputs, outputs and/or bi-directional ports implemented by the processor 102 may be varied according to the design criteria of a particular implementation.

In the embodiment shown, the capture devices 104*a*-104*n* may be components of the camera system 100*i*. In some embodiments, the capture devices 104*a*-104*n* may be separate devices (e.g., remotely connected to the camera system 100*i*, such as a drone, a robot and/or a system of security cameras configured capture video data) configured to send data to the camera system 100*i*. In one example, the capture devices 104*a*-104*n* may be implemented as part of an autonomous robot configured to patrol particular paths such as hallways. Similarly, in the example shown, the sensors 152, the microphones 154*a*-154*n*, the wireless communication device 156, and/or the speakers 158*a*-158*n* are shown external to the camera system 100*i* but in some embodiments may be a component of (e.g., within) the camera system 100*i*.

The camera system 100*i* may receive one or more signals (e.g., IMF_A-IMF_N), a signal (e.g., SEN), a signal (e.g., FEAT), a signal (e.g., AUTH) and/or one or more signals (e.g., DIR_AUD). The camera system 100*i* may present a signal (e.g., VDAT), a signal (e.g., CTRL) and/or a signal (e.g., DIR_AOUT). The capture devices 104*a*-104*n* may receive the signals IMF_A-IMF_N from the corresponding lenses 150*a*-150*n*. The processor 102 may receive the signal SEN from the sensors 152. In an example, the processor 102 may be configured to receive triple-sensor video input with high-speed SLVS/MIPI-CSI/LVCMOS interfaces. The processor 102 may receive the signal DIR_AUD from the microphones 154*a*-154*n*. The processor 102 may present the signal VDAT and/or the signal CTRL to the communication device 156 and receive the signal FEAT and/or the signal AUTH (e.g., an authentication signal from the access control device 50) from the communication device 156. For example, the wireless communication device 156 may be a radio-frequency (RF) transmitter. In another example, the communication device 156 may be a Wi-Fi module. In another example, the communication device 156 may be a device capable of implementing RF transmission, Wi-Fi, Bluetooth and/or other wireless communication protocols. In some embodiments, the signal VDAT may be presented to a display device connected to the camera 100*i*. The processor 102 may present the signal DIR_AOUT to the speakers 158*a*-158*n*.

The lenses 150*a*-150*n* may capture signals (e.g., IM_A-IM_N). The signals IM_A-IM_N may be an image (e.g., an analog image) of the environment near the camera system 100*i* presented by the lenses 150*a*-150*n* to the capture devices 104*a*-104*n* as the signals IMF_A-IMF_N. The lenses 150*a*-150*n* may be implemented as an optical lens. The lenses 150*a*-150*n* may provide a zooming feature and/or a focusing feature. The capture devices 104*a*-104*n* and/or the lenses 150*a*-150*n* may be implemented, in one example, as a single lens assembly. In another example, the lenses 150*a*-150*n* may be a separate implementation from the capture devices 104*a*-104*n*. The capture devices 104*a*-104*n* are shown within the circuit 100*i*. In an example implementation, the capture devices 104*a*-104*n* may be implemented outside of the circuit 100*i*(e.g., along with the lenses 150*a*-150*n* as part of a lens/capture device assembly).

In some embodiments, two or more of the lenses 150*a*-150*n* may be configured as a stereo pair of lenses. For example, the camera 100*i* may implement stereo vision. The lenses 150*a*-150*n* implemented as a stereo pair may be implemented at a pre-determined distance apart from each other and at a pre-determined inward angle. The pre-determined distance and/or the pre-determined inward angle may be used by the processor 102 to build disparity maps for stereo vision. The disparity maps may comprise disparity information and/or depth information used by the processor 102 to distinguish between objects to determine a number of people in the video frames.

In some embodiments, the processors 102 may be configured to perform depth sensing (e.g., the signals PIXELD_A-PIXELD_N may comprise depth information and/or vector light data in addition to information for generating the video frames). In one example, the capture devices 104*a*-104*n* and/or the processor 102 may perform depth sensing using multiple cameras (e.g., cameras configured as a stereo pair to capture a depth map). In another example, the capture devices 104*a*-104*n* and/or the processor 102 may perform depth sensing using time-of-flight. In yet another example, the capture devices 104*a*-104*n* and/or the processor 102 may perform depth sensing using structured light. The type of data analyzed by the processor 102 to perform the depth sensing may be varied according to the design criteria of a particular implementation.

The capture devices 104*a*-104*n* may be configured to capture image data for video (e.g., the signals IMF_A-IMF_N from the lenses 150*a*-150*n*). In some embodiments, the capture devices 104*a*-104*n* may be video capturing devices such as cameras. The capture devices 104*a*-104*n* may capture data received through the lenses 150*a*-150*n* to generate raw pixel data. In some embodiments, the capture devices 104*a*-104*n* may capture data received through the lenses 150*a*-150*n* to generate bitstreams (e.g., generate video frames). For example, the capture devices 104*a*-104*n* may receive focused light from the lenses 150*a*-150*n*. The lenses 150*a*-150*n* may be directed, tilted, panned, zoomed and/or rotated to provide a targeted view from the camera system 100*i* (e.g., a view for a video frame, a view for a panoramic video frame captured using multiple capture devices 104*a*-104*n*, a target image and reference image view for stereo vision, etc.). The capture devices 104*a*-104*n* may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170*a*-170*n* of the processor 102.

The capture devices 104*a*-104*n* may transform the received focused light signals IMF_A-IMF_N into digital data (e.g., bitstreams). In some embodiments, the capture devices 104*a*-104*n* may perform an analog to digital conversion. For example, the capture devices 104*a*-104*n* may perform a photoelectric conversion of the focused light received by the lenses 150*a*-150*n*. The capture devices 104*a*-104*n* may transform the bitstreams into pixel data, images and/or video frames. In some embodiments, the pixel data generated by the capture devices 104*a*-104*n* may be uncompressed and/or raw data generated in response to the focused light from the lenses 150a-150n. In some embodiments, the output of the capture devices 104a-104n may be digital video signals.

The sensors 152 may comprise one or more input devices. The sensors 152 may be configured to detect physical input from the environment and convert the physical input into computer readable signals. The signal SEN may comprise the computer readable signals generated by the sensors 152. In an example, one of the sensors 152 may be configured to detect an amount of light and present a computer readable signal representing the amount of light detected. In another example, one of the sensors 152 may be configured to detect motion and present a computer readable signal representing the amount of motion detected. The sensors 152 may be configured to detect temperature (e.g., a thermometer), orientation (e.g., a gyroscope), a movement speed (e.g., an accelerometer), etc. The types of input detected by the sensors 152 may be varied according to the design criteria of a particular implementation.

The data provided in the signal SEN provided by the sensors 152 may be read and/or interpreted by the processor 102. The processor 102 may use the data provided by the signal SEN for various operations. In some embodiments, the processor 102 may use a light reading from the sensors 152 to determine whether to activate an infrared light (e.g., to provide night vision). In another example, the processor 102 may use information about movement from an accelerometer and/or a gyroscope to perform motion correction on video frames generated. The types of operations performed by the processor 102 in response to the signal SEN may be varied according to the design criteria of a particular implementation.

The communication device 156 may send and/or receive data to/from the camera system 100i. In some embodiments, the communication device 156 may be implemented as a wireless communications module. In some embodiments, the communication device 156 may be implemented as a satellite connection to a proprietary system. In one example, the communication device 156 may be a hard-wired data port (e.g., a USB port, a mini-USB port, a USB-C connector, HDMI port, an Ethernet port, a DisplayPort interface, a Lightning port, etc.). In another example, the communication device 156 may be a wireless data interface (e.g., Wi-Fi, Bluetooth, ZigBee, cellular, etc.).

The communication device 156 may be configured to receive the signal FEAT. The signal FEAT may comprise a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 102 may receive the signals PIXELD_A-PIXELD_N from the capture devices 104a-104n at the inputs 170a-170n. The processor 102 may send/receive a signal (e.g., DATA) to/from the memory 160 at the input/output 172. The processor 102 may receive the signal SEN from the sensors 152 at the input port 174. The processor 102 may receive the signal DIR_AUD from the microphones 154a-154n at the port 176. The processor 102 may send the signal DIR_AOUT to the speakers 158a-158n via the port 178. The processor 102 may send the signal VDAT to the communication device 156 via the output port 180a. The processor 102 may receive the signal FEAT from the communication device 156 via the input port 180b. The processor 102 may send the signal CTRL to the communication device via the output port 180c. The processor 102 may send the signal AUTH to the communication device via the output port 180d. In an example, the processor 102 may be connected through a bi-directional interface (or connection) to the capture devices 104a-104n, the sensors 152, the microphones 154a-154n, the communication device 156, and/or the speakers 158a-158n and/or the memory 160. The processor 102 may store and/or retrieve data from the memory 160. The memory 160 may be configured to store computer readable/executable instructions (or firmware). The instructions, when executed by the processor 102, may perform a number of steps.

The signal PIXELD_A-PIXELD_N may comprise raw pixel data providing a field of view captured by the lenses 150a-150n. The processor 102 may be configured to generate video frames from the pixel data PIXELD_A-PIXELD_N. The video frames generated by the processor 102 may be used internal to the processor 102 (e.g., to perform video encoding, video transcoding, perform computer vision operations, etc.). The processor 102 may be configured to process the pixel data arranged as video frames. In some embodiments, the video frames may be communicated to the memory 160 for temporary storage. The processor 102 may be configured to generate encoded video frames and communicate the encoded video frames to the communication device 156 as the signal VDAT.

The processor 102 may be configured to make decisions based on analysis of the video frames generated from the signals PIXELD_A-PIXELD_N. The processor 102 may generate the signal VDAT, the signal CTRL, the signal DATA, the signal DIR_AOUT and/or other signals (not shown). The signal VDAT, the signal CTRL, the signal DATA and/or the signal DIR_AOUT may each be generated (in part) based on one or more decisions made and/or functions performed by the processor 102. The decisions made and/or functions performed by the processor 102 may be determined based on data received by the processor 102 at the inputs 170a-170n (e.g., the signals PIXELD_A-PIXELD_N), the input 172, the input 174, the input 176, the input 180b, the input 180d and/or other inputs.

The inputs 170a-170n, the input/output 172, the input 174, the input 176, the output 178, the output 180a, the input 180b, the output 180c, the input 180d and/or other inputs/outputs may implement an interface. The interface may be implemented to transfer data to/from the processor 102, the sensors 152, the communication device 156, the capture devices 104a-104n, the memory 160, the microphones 154a-154n, the speakers 158a-158n and/or other components of the camera system 100i. In one example, the interface may be configured to receive (e.g., via the inputs 170a-170n) the pixel data signals PIXELD_A-PIXELD_N each from a respective one of the capture devices 104a-104n. In another example, the interface may be configured to receive (e.g., via the input 174) sensor input from the sensors 152. In yet another example, the interface may be configured to receive (e.g., via the input 176) the directional audio DIR_AUD. In still another example, the interface may be configured to transmit encoded video frames (e.g., the signal VDAT) and/or the converted data determined based on the computer vision operations to the communication device 156. In one yet another example, the interface may be configured to transmit a control signal (e.g., the signal CTRL) in response to decisions made based on the computer vision operations to the communication device 156 (e.g., via the output port 180c). In another example, the interface may be configured to receive the feature set information FEAT (e.g., via the input port 180b) from the communication device 156. In another example, the interface may be configured to receive the authorization signal AUTH (e.g., via the input port 180d). In yet another example, the interface may be configured to transmit directional audio output (e.g., the signal DIR_AOUT) to each of the speakers 158a-158n. The interface may be configured to enable transfer of data and/or translate data from one format to another format to ensure that the data transferred is readable by the intended destination component. In an example, the interface may comprise a data bus, traces, connectors, wires and/or pins. The interface may enable Gigabit Ethernet, a USB 2.0 host and device, multiple (e.g., three) SD card controllers with SDXC support and/or MIPI-DSI/CSI output. The implementation of the interface may be varied according to the design criteria of a particular implementation.

The signal VDAT may be presented to the communication device 156. In some embodiments, the signal VDAT may comprise encoded video frames generated by the processor 102. In some embodiments, the encoded video frames may comprise a full video stream (e.g., encoded video frames representing all video captured by the capture devices 104a-104n). The encoded video frames may be encoded, cropped, stitched and/or enhanced versions of the pixel data received from the signals PIXELD_A-PIXELD_N. In an example, the encoded video frames may be a high resolution, digital, encoded, de-warped, stabilized, cropped, blended, stitched and/or rolling shutter effect corrected version of the signals PIXELD_A-PIXELD_N.

In some embodiments, the signal VDAT may be generated based on video analytics (e.g., computer vision operations) performed by the processor 102 on the video frames generated from the pixel data PIXELD_A-PIXELD_N. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VDAT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal VDAT may be provided to a cloud service for mass storage (e.g., to enable a user to retrieve the encoded video using a smartphone and/or a desktop computer). In some embodiments, the signal VDAT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VDAT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 152 (e.g., a temperature reading, a motion sensor reading, etc.). The signal CTRL may be generated based on a number of people detected in the video frames. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The processor 102 may be configured to generate the signal CTRL in response to sensor fusion operations (e.g., aggregating information received from disparate sources). The conditions for generating the signal CTRL may be varied according to the design criteria of a particular implementation.

The circuit 100i may implement a camera system. In some embodiments, the camera system 100i may be implemented as a drop-in solution (e.g., installed as one component). In an example, the camera system 100i may be a device that may be installed as an after-market product (e.g., a retro-fit for a drone, a retro-fit for a security system, etc.). In some embodiments, the camera system 100i may be a component of a security system. The number and/or types of signals and/or components implemented by the camera system 100i may be varied according to the design criteria of a particular implementation.

The video data of the targeted view captured by the capture devices 104a-104n may be generated from the signals/bitstreams/data PIXELD_A-PIXELD_N. The capture devices 104a-104n may present the signals PIXELD_A-PIXELD_N to the inputs 170a-170n of the processor 102. The signals PIXELD_A-PIXELD_N may be used by the processor 102 to generate the video frames/video data. In some embodiments, the signals PIXELD_A-PIXELD_N may be video streams captured by the capture devices 104a-104n. In some embodiments, the capture devices 104a-104n may be implemented in the camera system 100i. In some embodiments, the capture devices 104a-104n may be configured to add to existing functionality to the camera system 100i.

Each of the capture devices 104a-104n may comprise a block (or circuit) 182, a block (or circuit) 184, and/or a block (or circuit) 186. The circuit 182 may implement a camera sensor (e.g., a complementary metal-oxide-semiconductor (CMOS) sensor). The circuit 184 may implement a camera processor/logic. The circuit 186 may implement a memory buffer. As a representative example, the capture device 104a is shown comprising the sensor 182a, the logic block 184a and the buffer 186a. Similarly, the capture devices 104b-

104*n* may comprise the camera sensors 182*b*-182*n*, the logic blocks 184*b*-184*n* and the buffers 186*b*-186*n*. The sensors 182*a*-182*n* may each be configured to receive light from the corresponding one of the lenses 150*a*-150*n* and transform the light into digital data (e.g., the bitstreams).

In one example, the sensor 182*a* of the capture device 104*a* may receive light from the lens 150*a*. The camera sensor 182*a* of the capture device 104*a* may perform a photoelectric conversion of the light from the lens 150*a*. In some embodiments, the sensor 182*a* may be an oversampled binary image sensor. In some embodiments, the camera sensor 182*a* may comprise an RGB sensor or an RGB-IR sensor. In some embodiments, the camera sensor 182*a* may comprise a rolling shutter sensor or a global shutter sensor. The logic 184*a* may transform the bitstream into a human-legible content (e.g., pixel data and/or video data). For example, the logic 184*a* may receive pure (e.g., raw) data from the camera sensor 182*a* and generate pixel data based on the raw data (e.g., the bitstream). The memory buffer 186*a* may store the raw data and/or the processed bitstream. For example, the frame memory and/or buffer 186*a* may store (e.g., provide temporary storage and/or cache) the pixel data and/or one or more of the video frames (e.g., the video signal).

The microphones 154*a*-154*n* may be configured to capture incoming audio and/or provide directional information about the incoming audio. Each of the microphones 154*a*-154*n* may receive a respective signal (e.g., AIN_A-AIN_N). The signals AIN_A-AIN_N may be audio signals from the environment near the camera system 100*i*. For example, the signals AIN_A-AIN_N may be ambient noise in the environment. The microphones 154*a*-154*n* may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 154*a*-154*n* may provide the signal DIR_AUD to the interface 176. The camera system 100*i* may comprise the interface 176 configured to receive data (e.g., the signal DIR_AUD) from one or more of the microphones 154*a*-154*n*. In one example, data from the signal DIR_AUD presented to the interface 176 may be used by the processor 102 to determine the location of the source of the audio input. In another example, the microphones 154*a*-154*n* may be configured to determine the location of the audio input and present the location to the interface 176 as the signal DIR_AUD.

The number of microphones 154*a*-154*n* may be varied according to the design criteria of a particular implementation. The number of microphones 154*a*-154*n* may be selected to provide sufficient directional information about the incoming audio (e.g., the number of microphones 154*a*-154*n* implemented may be varied based on the accuracy and/or resolution of directional information acquired). In an example, 2 to 6 of the microphones 154*a*-154*n* may be implemented. In some embodiments, an audio processing component may be implemented with the microphones 154*a*-154*n* to process and/or encode the incoming audio signals AIN_A-AIN_N. In some embodiments, the processor 102 may be configured with on-chip audio processing to encode the incoming audio signals AIN_A-AIN_N. The microphones 154*a*-154*n* may capture audio of the environment. The camera system 100*i* may be configured to synchronize the audio captured with the images captured by the capture devices 104*a*-104*n*.

The processor 102 may be configured to execute computer readable code and/or process information. The processor 102 may be configured to receive input and/or present output to the memory 160. The processor 102 may be configured to present and/or receive other signals (not shown). The number and/or types of inputs and/or outputs of the processor 102 may be varied according to the design criteria of a particular implementation.

The processor 102 may receive the signals PIXELD_A-PIXELD_N, the signal SEN, the signal DIR_AUD, the signal FEAT, the signal AUTH and/or the signal DATA. The processor 102 may make a decision based on data received at the inputs 170*a*-170*n*, the input 172, the input 174, the input 176, the input 180*b*, the input 180*d* and/or other input. For example, other inputs may comprise external signals generated in response to user input, external signals generated by the sensors 152, the microphones 154*a*-154*n* and/or internally generated signals such as signals generated by the processor 102 in response to analysis of the video frames and/or objects detected in the video frames. The processor 102 may adjust the video data (e.g., crop, digitally move, physically move the camera sensors 182*a*-182*n*, etc.) of the video frames. The processor 102 may generate the signal VDAT, the signal CTRL and/or the signal DIR_AOUT in response to data received by the inputs 170*a*-170*n*, the input 172, the input 174, the input 176, the input 180*b*, the input 180*d* and/or the decisions made in response to the data received by the inputs 170*a*-170*n*, the input 172, the input 174, the input 176 the input 180*b* and/or the input 180*d*. The various operations performed by the processor 102 may be performed locally (e.g., using the internal components of the camera 100*i* rather than offloading computing operations to external resources such as a cloud service).

The signal VDAT, the signal CTRL and/or the signal DIR_AOUT may be generated to provide an output in response to the captured video frames, the video encoding and/or the video analytics performed by the processor 102. For example, the video analytics may be performed by the processor 102 in real-time and/or near real-time (e.g., with minimal delay).

The cropping, downscaling, blending, stabilization, packetization, encoding, compression and/or conversion performed by the processor 102 may be varied according to the design criteria of a particular implementation. For example, the video frames generated by the processor 102 may be a processed version of the signals PIXELD_A-PIXELD_N configured to enable detection of the objects and/or determination of the characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 104*a*-104*n*. For example, the video frames may comprise a portion of the panoramic video captured by the capture devices 104*a*-104*n*. In another example, the video frames may comprise a region of interest selected and/or cropped from the panoramic video frame by the processor 102 (e.g., upscaled, oversampled and/or digitally zoomed) to enable a high precision of object detection. In some embodiments, the video frames may provide a series of cropped and/or enhanced video frames that improve upon the view from the perspective of the camera system 100*i* (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The memory 160 may store data. The memory 160 may be implemented as a cache, flash memory, DRAM memory, etc. The type and/or size of the memory 160 may be varied according to the design criteria of a particular implementation. The data stored in the memory 160 may correspond to a video file, user profiles, user permissions, a feature set, types of objects/events of interest, information about the configuration of the lenses 150a-150n, etc.

The battery 162 may be configured to provide power to the components of the camera 100i. The battery 162 may enable the camera 100i to operate without continual access to an external power supply. In an example, the battery 162 may comprise a lithium-ion type of battery. In another example, the battery 162 may comprise a supercapacitor. The type of battery 162 implemented may be varied according to the design criteria of a particular implementation.

The lenses 150a-150n (e.g., camera lenses) may be directed to provide a panoramic view from the camera system 100i. The lenses 150a-150n may be aimed to capture environmental data (e.g., light). The lens 150a-150n may be configured to capture and/or focus the light for the capture devices 104a-104n. Generally, the camera sensors 182a-182n may be located behind each of the respective lenses 150a-150n. Based on the captured light from the lenses 150a-150n, the capture devices 104a-104n may generate a bitstream and/or raw pixel data.

Embodiments of the processor 102 may perform video stitching operations on the signals PIXELD_A-PIXELD_N. In one example, each of the pixel data signals PIXELD_A-PIXELD_N may provide a portion of a panoramic view and the processor 102 may crop, blend, synchronize and/or align the pixel data from the signals PIXELD_A-PIXELD_N to generate the panoramic video frames. In some embodiments, the processor 102 may be configured to perform electronic image stabilization (EIS). The processor 102 may perform de-warping on the video frames. The processor 102 may perform intelligent video analytics on the de-warped video frames. The processor 102 discard the video frames after the video analytics and/or computer vision has been performed.

The encoded video frames may be processed locally. In one example, the encoded, panoramic video may be stored locally by the memory 160 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

The processor 102 may receive an input to generate the video frames (e.g., the signals PIXELD_A-PIXELD_N) from the CMOS sensor(s) 182a-182n. The pixel data signals PIXELD_A-PIXELD_N may be enhanced by the processor 102 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100i may be used to generate panoramic video such as a spherical video, a hemispherical video, a 360 degree video, a wide angle video, a video having less than a 360 field of view, etc.

Panoramic videos may comprise a view of the environment near the camera system 100i. In one example, the entire field of view of the panoramic video may be captured at generally the same time (e.g., each portion of the panoramic video represents the view from the camera system 100i at one particular moment in time). In some embodiments (e.g., when the camera system 100i implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100i.

In some embodiments, the field of view may provide coverage for a full 360 degree field of view. In some embodiments, less than a 360 degree view may be captured by the camera system 100i (e.g., a 270 degree field of view, a 180 degree field of view, etc.). In some embodiments, the panoramic video may comprise a spherical field of view (e.g., capture video above and below the camera system 100i). For example, the camera system 100i may be mounted on a ceiling and capture a spherical field of view of the area below the camera system 100i. In some embodiments, the panoramic video may comprise a field of view that is less than a spherical field of view (e.g., the camera system 100i may be configured to capture the ground below and the areas to the sides of the camera system 100i but nothing directly above). The implementation of the camera system 100i and/or the captured field of view may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle lens (e.g., the lens 150a), the lens 150a may be located to provide coverage for the full 360 degree field of view (e.g., on the bottom of the camera system 100i in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the camera system 100i may be implemented as a system on chip (SoC). For example, the camera system 100i may be implemented as a printed circuit board comprising one or more components (e.g., the capture devices 104a-104n, the processor 102, the communication device 156, the memory 160, etc.). The camera system 100i may be configured to perform intelligent video analysis on the video frames of the video. The camera system 100i may be configured to crop and/or enhance the video.

In some embodiments, the processor 102 may be configured to perform sensor fusion operations. The sensor fusion operations performed by the processor 102 may be configured to analyze information from multiple sources (e.g., the capture devices 104a-104n, the sensor 152 and the microphones 154a-154n). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from the directional audio DIR_AUD. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100i. However, the computer vision operations performed using the feature set may be performed using the computational resources of the processor 102 within the camera system 100i.

The signal DIR_AOUT may be an audio output. For example, the processor 102 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message for people detected. In some embodiments, the signal DIR_AOUT may not be generated until an event has been detected by the processor 102 using the computer vision operations.

The signal DIR_AOUT may comprise directional and/or positional audio output information for the speakers 158a-158n. The speakers 158a-158n may receive the signal DIR_AOUT, process the directional and/or positional information and determine which speakers and/or which channels will play back particular audio portions of the signal DIR_AOUT. The speakers 158a-158n may generate the signals AOUT_A-AOUT_N in response to the signal DIR_AOUT. The signals AOUT_A-AOUT_N may be the audio message played. For example, the speakers 158a-158n may emit a pre-recorded message in response to a detected event. The signal DIR_AOUT may be a signal generated in a format that provides directional information for the signals AOUT_A-AOUT_N.

The number of speakers 158a-158n may be varied according to the design criteria of a particular implementation. The number of speakers 158a-158n may be selected to provide sufficient directional channels for the outgoing audio (e.g., the number of speakers 158a-158n implemented may be varied based on the accuracy and/or resolution of directional audio output). In an example, 1 to 6 of the speakers 158a-158n may be implemented. In some embodiments, an audio processing component may be implemented by the speakers 158a-158n to process and/or decode the output audio signals DIR_AOUT. In some embodiments, the processor 102 may be configured with on-chip audio processing. In some embodiments, the signal DIR_AOUT may playback audio received from remote devices (e.g., smartphones) in order to implement a 2-way real-time audio communication.

The video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 M Pixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The sensors 182a-182n may each implement a high-resolution sensor. Using the high resolution sensors 182a-182n, the processor 102 may combine over-sampling of the image sensors 182a-182n with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, one or more of the lenses 150a-150n may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., the directional microphones 154a-154n may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensors 182a-182n. The over-sampling of the image sensors 182a-182n may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture devices 104a-104n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The hardware modules 190a-190n may be configured to implement various security features (e.g., secure boot, I/O virtualization, etc.). The features and/or functionality of the hardware modules 190a-190n may be varied according to the design criteria of a particular implementation. Details of the hardware modules 190a-190n and/or other components of the camera system 100i may be described in association with U.S. patent application Ser. No. 15/931,942, filed May 14, 2020, U.S. patent application Ser. No. 16/831,549, filed on Mar. 26, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera 100i.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n(e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190b as a dedicated hardware module of the processor 102 may enable the camera system 100i to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 102 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 102 may determine body position, and/or body characteristics of the people 70a-70n.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

In some embodiments, one or more of the hardware modules 190a-190n may be configured to implement a disparity engine. The disparity engine may be configured to determine a distance based on images captured as a stereo pair. Two or more of the capture devices 104a-104n may be configured as a stereo pair of cameras. The capture devices 104a-104n configured as a stereo pair may be implemented close to each other at a pre-defined distance and/or have a symmetrical orientation about a central location. The capture devices 104a-104n configured as a stereo pair may be configured to capture video frames from similar, but slightly different perspectives (e.g., angled inwards to capture fields of view that overlap).

The disparity engine implemented by the hardware modules 190a-190n may be configured to perform a comparison to analyze the differences between the stereo pair of images. In an example, the processor 102 may detect feature points of the same object detected in both video frames captured by the capture devices 104a-104n configured as a stereo pair. The disparity engine may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 104a-104n configured as a stereo pair, the disparity engine may be configured to determine a distance. The distance determined by the disparity engine may be the distance from the capture devices 104a-104n configured as a stereo pair. In an example, the disparity engine may determine a distance from the capture devices 104a-104n configured as a stereo pair to a particular object (e.g., a vehicle, a bicycle, a pedestrian, a plant, a decoration, etc.) based on the comparison of the differences in the stereo pair of images captured.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 5:
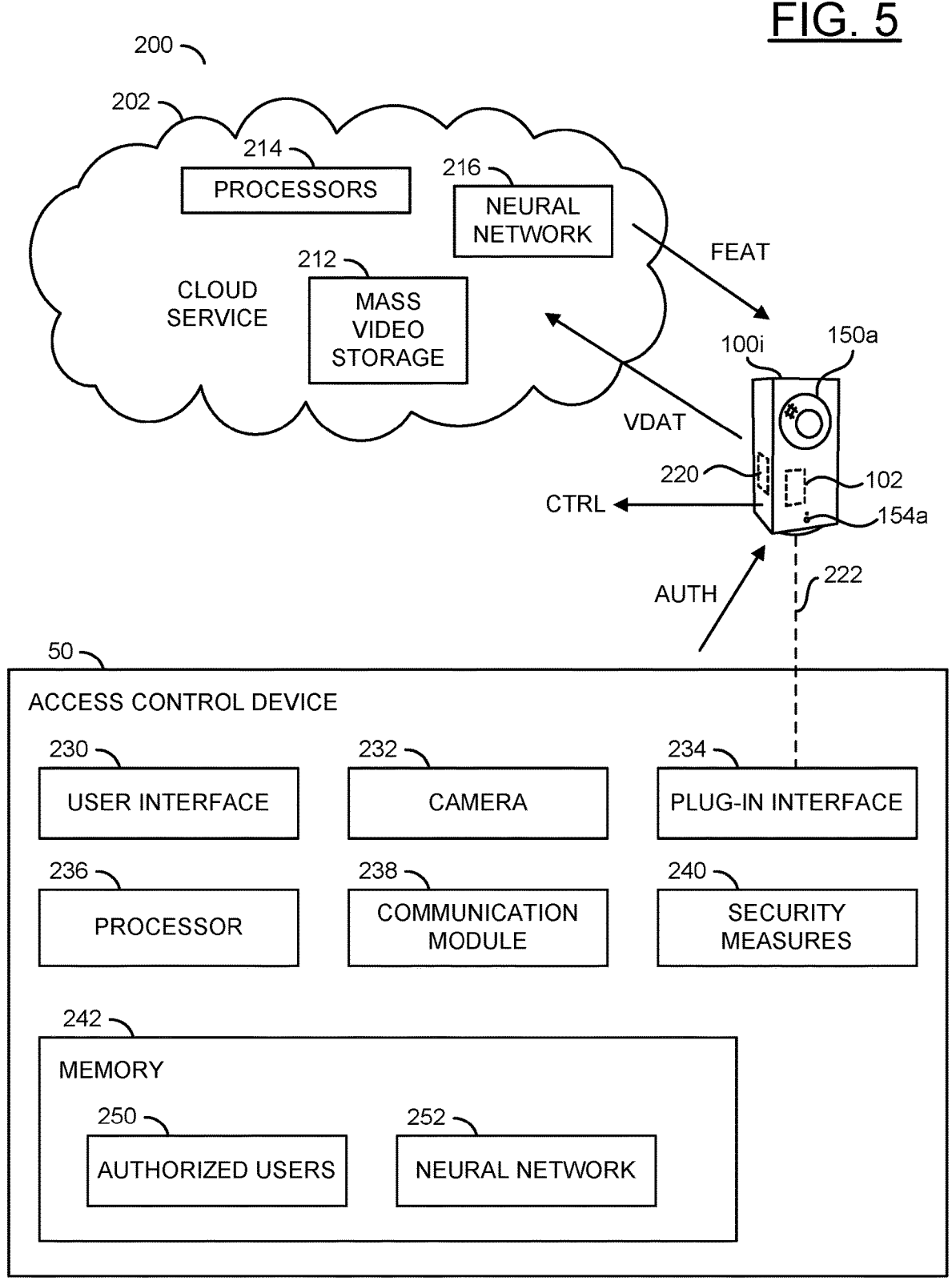
FIG. 5 is a diagram illustrating a camera communicating with a cloud server and an access control device.

Referring to FIG. 5, a diagram illustrating a camera communicating with a cloud server and an access control device is shown. A system 200 is shown. The system 200 may comprise the access control device 50, the camera system 100i and/or a server 202. The lens 150a and the microphone 154a are shown on the camera system 100i. The processor 102 is shown within the camera system 100i.

The server 202 may implement a cloud service. The cloud service 202 may comprise a block (or module) 212, a block (or module) 214 and/or a block (or module) 216. The module 212 may implement mass video storage. The module 214 may implement one or more processors. The module 216 may implement a neural network. The mass video storage 212 and/or the neural network 216 may be implemented using one or more types of memory implemented by the cloud service 202. The cloud service 202 may comprise other components (not shown). The number, type and/or arrangement of the components of the cloud service 202 may be varied according to the design criteria of a particular implementation.

The cloud service 202 may be implemented as part of a cloud computing platform (e.g., distributed computing). In an example, the cloud service 202 may be implemented as a group of cloud-based, scalable server computers. By implementing a number of scalable servers, additional resources (e.g., power, processing capability, memory, etc.) may be available to process and/or store variable amounts of data. For example, the cloud service 202 may be configured to scale (e.g., provision resources) based on demand. The cloud service 202 may implement scalable computing (e.g., cloud computing). The scalable computing may be available as a service to allow access to processing and/or storage resources without having to build infrastructure.

In some embodiments, the cloud service 202 may be configured to provide resources such as training data and/or a database of feature maps (e.g., feature maps of recognized objects that may be used as a basis to perform object recognition and/or classification). Generating the feature maps may be performed by the cloud service 202 since the cloud service 202 may have access to a large amount of training data (e.g., all the video frames uploaded by the cameras 100a-100n and/or other devices). Feature maps and/or training data may be stored in the neural network 216. The neural network 216 may be configured to provide a feature set to the camera system 100i in response to the particular events and/or objects selected for detection. In one example, individual users may select different types of events and/or objects to detect (e.g., objects of interest). The types of feature sets provided to the camera system 100i may be varied depending on the objects of interest selected by each user.

In some embodiments, the cloud service 202 may be configured to provide storage resources. The mass video storage 212 may be configured to provide long-term storage of video data. For example, the cloud service 202 may comprise storage resources (e.g., hard drives, solid state drives, etc.) that enable considerably more storage capacity than available internally on the camera system 100i.

The cloud service 202 may have access to considerably more bandwidth capacity than the camera system 100i. The bandwidth capacity available to the cloud service 202 may enable the cloud service 202 to stream video to remote devices (e.g., smartphones, internet-connected TVs, laptops, desktop computers, etc.).

The edge AI camera 100*i* may be configured to communicate with the access control device 50, the remote cloud service 202 and/or other devices (e.g., smartphones). The edge AI camera 100*i* may be a representative example of any of the camera systems 100*a*-100*n*. A block (or circuit) 220 and a physical connection 222 are shown. The circuit 220 may comprise a security response device. The physical connection 222 may enable communication between the camera system 100*i* and the access control device 50.

The security response device 220 may be configured to perform a security response based on decisions made by the processor 102. In an example, the security response device 220 may be activated by the signal CTRL. For example, the signal CTRL may be used internally by the camera system 100*i* to perform a security measure. In one example, the security measure implemented by the security response device 220 may be an audio alarm. In another example, the security measure implemented by the security response device 220 may be a light. The type of the security response device 220 may be varied according to the design criteria of a particular implementation.

In some embodiments, the camera system 100*i* may communicate with the cloud service 202 and/or the access control device 50 wirelessly. In some embodiments, the camera system 100*i* may communicate with the cloud service 202 and/or the access control device 50 via the physical connection 222 (e.g., an ethernet connection, a USB connection, a wire, etc.).

The edge AI camera 100*i* is shown communicating the signal VDAT and the signal CTRL. The edge AI camera 100*i* is shown receiving the signal FEAT and/or the signal AUTH. The signal VDAT may comprise video frames generated by the processor 102 in response to the pixel data PIXELD_A-PIXELD_N. The signal AUTH may be the authentication signal generated by the access control device 50. The edge AI camera 100*i* may be configured to communicate and/or generate other signals (not shown). The number, type and/or format of the signals communicated and/or generated by the edge AI camera 100*i* may be varied according to the design criteria of a particular implementation.

The edge AI camera 100*i* may be configured to upload the encoded video frames and/or the features extracted from the video frames (e.g., the signal VDAT) to the cloud service 202. In some embodiments, the edge AI camera 100*i* may encode the video frames and/or generate a low bitrate video stream (e.g., one of the multiple parallel bitstreams generated) before uploading to limit an amount of bandwidth consumed compared to uploading unencoded video frames. In some embodiments, the encoded video frames VDAT may comprise all of the video data generated by the edge AI camera 100*i*. In some embodiments, the signal VDAT may comprise feature points extracted from the video frames. In the example shown, the signal VDAT may be communicated to the cloud service 202. In some embodiments, the signal VDAT may be communicated to the access control device 50.

In some embodiments, the processors 214 and/or neural network 216 may be configured to generate a machine readable DAG. The machine readable DAG may comprise a neural network and/or computer readable instructions that define the types of objects and/or events that may be detected by the processor 102 of the camera system 100*i*. For example, the machine readable DAG may be generated according to an application programming interface (API) (e.g., a format) compatible with the camera system 100*i*. The machine readable DAG may comprise one or more neural networks (e.g., each neural network may correspond to various types of objects to detect). The machine readable DAG may be provided to the camera system 100*i* in the signal FEAT.

The camera system 100*i* may receive the signal FEAT from the cloud service 202. The processor 102 may convert the feature set information in the signal FEAT to detection parameters. The camera system 100*i* may capture pixel data and generate the video frames from the pixel data PIXELD_A-PIXELD_N. The processor 102 may process the pixel data arranged as video frames using the detection parameters received in the signal FEAT.

The processor 102 may receive the feature set signal FEAT to detect objects/events. The edge AI camera 100*i* may be configured to upload the encoded video frames to the cloud service 202. The encoded video frames VDAT may be stored in the mass video storage 212 of the cloud service 202. In some embodiments, the processors 214 may transcode the video frames received from the camera system 100*i* and then perform computer vision operations on the video frames based on the neural network 216. Based on the results of the computer vision operations, the processors 214 may generate a security measure (e.g., sound an alarm, present a notification to a security guard, initiate a lockdown procedure, etc.).

The access control device 50 may comprise a block (or circuit) 230, a block (or circuit) 232, a block (or circuit) 234, a block (or circuit) 236, a block (or circuit) 238, a block (or circuit) 240 and/or a block (or circuit) 242. The circuit 230 may implement a user interface. The circuit 232 may implement a camera and/or a sensor. The circuit 234 may implement a plug-in interface. The circuit 236 may implement a processor. The circuit 238 may implement a communication module. The circuit 240 may implement security measures. The access control device 50 may comprise other components (not shown). The number, type and/or arrangement of the components of the access control device 50 may be varied according to the design criteria of a particular implementation.

The user interface 230 may enable the users (e.g., the person 60, the person 62, etc.) to provide input to the access control device 50 and/or enable the access control device 50 to present output to the users. In one example, the user interface 230 may comprise the display 54 and/or the keypad 56. For example, the user interface 230 may be one component of the access control device 50 that may be configured to receive the credentials 64 presented by the users.

The camera 232 may be one example of a sensor implemented by the access control device 50. In an example, the camera 232 may be the sensor 52 shown in association with FIG. 1. The camera 232 may be one example component of the access control device 50 that may be configured to receive the credentials 64 presented by the users. In an example, the camera 232 may be configured to capture an image of an ID card to perform authentication.

The plug-in interface 234 may enable various peripherals to connect to access control device 50. The plug-in interface 234 may comprise a standard connector (e.g., a USB connection) and/or a proprietary connector. In the example shown, the plug-in interface 234 may be connected to the physical connector 222 to enable communication between the access control device 50 and the camera system 100*i*. The plug-in interface 234 may enable extensible functionality to be added to the access control device 50 via an API. In the example shown, the camera system 100*i* may provide the extensible functionality of computer vision to the access control device 50. In one example, the plug-in interface 234 may enable the access control device 50 to communicate the signal AUTH to the camera system 100*i*. In another example, the plug-in interface 234 may enable the camera system 100*i* to communicate the signal CTRL to the access control device 50. In yet another example, the plug-in interface 234 may enable the camera system 100*i* to communicate the signal VDAT (e.g., video frames and/or feature points extracted from the video frames) to the access control device 50. The types of data communicated and/or the types of devices that may extend the functionality of the access control device 50 via the plug-in interface 234 may be varied according to the design criteria of a particular implementation.

The processor 236 may enable the access control device 50 to execute computer readable instructions, read data, generate outputs in response to input, etc. The processor 236 may be configured to determine whether a user is authorized to enter the secured area 80. The authorization signal AUTH may be generated in response to decisions made by the processor 236.

The communication module 238 may be configured to send data to and/or receive data from external devices (e.g., the cloud server 202 and/or the camera system 100*i*). The communication module 238 may be configured to communicate via various communication protocols (e.g., Wi-Fi, Bluetooth, ZigBee, etc.). In one example, the communication module 238 may be configured to communicate the signal AUTH to the camera system 100*i*. In another example, the communication module 238 may be configured to receive the signal CTRL and/or the signal VDAT from the camera system 100*i*.

The security measures 240 may comprise various components (e.g., actuators, output devices, etc.) that may be used as responses that may be performed by the access control device 50. The security measures 240 may be performed in response to decisions made by the processor 236. In one example, the security measures 240 may be performed in response to detecting the credentials 64 (e.g., unlocking the door 42 in response to determining that the credentials 64 are authorized, locking the door 42 in response to determining that the credentials 64 are unauthorized, etc.). In another example, the security measures 240 may be performed in response to the signal CTRL generated by the camera system 100*i*. In yet another example, the security measures 240 may be performed in response to computer vision operations performed by the access control device 50. The security measures 240 may comprise an audio alarm, communicating a notification (e.g., a warning about a detected intruder), flashing a light, initiating a lockdown, etc.). The security measures 240 performed by the access control device 50 may be similar to the security measures that may be performed by the security response device 220 of the camera system 100*i*.

The memory 242 may comprise local storage for the access control device 50. The memory 242 may comprise embedded flash memory, RAM, a hard drive, a solid state drive, a cache, etc. The memory 242 may comprise computer readable instructions that may be executed by the processor 236. The memory 242 may comprise storage for the video data communicated via the signal VDAT.

The memory 242 may comprise a block (or circuit) 250 and/or a block (or circuit) 252. The circuit 250 may comprise authorized users storage. The circuit 252 may comprise a neural network. The memory 242 may comprise other components (not shown). The number, type and/or arrangement of the components of the memory 242 may be varied according to the design criteria of a particular implementation.

The authorized users storage 250 may comprise a database of people that may be permitted to enter the secured area 80. The authorized users storage 250 may comprise credentials and/or user IDs. The processor 236 may be configured to compare the credentials 64 received via the user interface 230 and/or the camera 232 with the credential data stored in the authorized users storage 250. The processor 236 may generate the signal AUTH in response to a match between the credentials 64 received and one of the entries of the credential data stored in the authorized users storage 250.

The neural network 252 may enable the access control device 50 to perform computer vision operations. In some embodiments, the access control device 50 may receive the video data VDAT from the camera system 100*i*, perform computer vision operations on the video data using the neural network 252 and perform one of the security measures 240 in response to the number of people detected. In some embodiments, the neural network 252 may be configured to generate the feature set for the camera system 100*i* and communicate the signal FEAT to the camera system 100*i*.

The access control device 50 may be configured to generate the signal AUTH in response to determining that the credentials 64 presented are authorized. The signal AUTH may be used internally by the access control device 50. For example, the signal AUTH may be presented to one of the security measures 240 that may be configured to unlock the door 42 to enable the person 60 access to the secured area 80.

The access control device 50 may communicate the signal AUTH to the camera system 100*i* (e.g., wirelessly using the communication module 238 or via the physical connection 222). The signal AUTH may comprise information about the people authorized to enter the secured area 80. In one example, the signal AUTH may comprise a number of people permitted to enter the secured area 80. In some embodiments, the access control device 50 may indicate that one person is allowed to enter the secured area 80 when the authorized credentials are detected. In some embodiments, the access control device 50 may indicate that more than one person is allowed to enter the secured area 80 when the authorized credentials are detected (e.g., an employee giving a tour of the secured area 80 to multiple people). The CNN module 190*b* may use the number of people provided by the signal AUTH to determine whether a matching number of people have been detected attempting to enter the secured area 80 and/or have entered the secured area 80. In some embodiments, the signal AUTH may comprise feature points of faces associated with the credentials 64 and the CNN module 190*b* may perform facial recognition to determine whether the face of the person 60 and/or the person 62 matches the face associated with the credentials 64.

In some embodiments, the camera system 100*i* may be configured to be implemented as a standalone camera/sensor (e.g., a standalone device capable of operating independent from the access control device 50). The camera system 100*i* may be configured to receive the authorization signal AUTH from the access control device 50 and the CNN module 190*b* may be configured to perform the computer vision operations to detect the number of people near the secured area 80 (e.g., determine how many people are attempting to enter the secured area 80). The processor 102 may generate the control signal CTRL in response to detecting more people attempting to enter the secured area 80 than the number of people permitted as indicated by the signal AUTH. In some embodiments, the control signal CTRL may be used to activate the security response device 220 implemented by the camera system 100*i* (e.g., the detection of the people and the security measure may all be performed locally by the camera system 100*i*). In some embodiments, the signal CTRL may be communicated to the access control device 50 and the access control device 50 may activate one of the security measures 240 (e.g., the detection of the people may be performed locally by the camera system 100*i* and the security measure may be performed by the access control device 50). In some embodiments, the signal CTRL may be communicated to the cloud service 202 and the cloud service 202 may activate a security measures (e.g., the detection of the people may be performed locally by the camera system 100*i* and the security measure may be performed by the cloud service 202).

In some embodiments, the camera system 100*i* may be implemented as an accessory that may be plugged into (or communicate wirelessly with) the access control device 50. For example, the connection may be via the physical connection 222 (e.g., USB, proprietary connectors) and/or wirelessly (e.g., Bluetooth, ZigBee, Wi-Fi, a proprietary protocol, etc.). For example, the camera system 100*i* may communicate the video data VDAT in response to the signal AUTH. The processor 236 and the neural network 252 implemented by the access control device 50 may perform the computer vision operations to determine whether the number of people detected in the video frames generated by the camera system 100*i* matches the number of people authorized to enter the secured area 80. In response to detecting tailgating, the access control device 50 may activate one of the security measures 240. In some embodiments, the camera system 100*i* may be configured to generate the video frames of the entrance of the secured area 80 and/or extract features from the video frames, and the access control device 50 may be configured to perform the computer vision operations to determine the number of people and perform the security response.

In some embodiments, the camera system 100*i* may communicate the video data VDAT to the cloud service 202 in response to the signal AUTH. The processors 214 and the neural network 216 implemented by the cloud service 202 may perform the computer vision operations to determine whether the number of people detected in the video frames generated by the camera system 100*i* matches the number of people authorized to enter the secured area 80. In response to detecting tailgating, the cloud service 202 may activate a security measure (or communicate a control signal for activating a security measure to the camera system 100*i* and/or the access control device 50). In some embodiments, the camera system 100*i* may be configured to generate the video frames of the entrance of the secured area 80 and/or extract features from the video frames, and the cloud service 202 may be configured to perform the computer vision operations to determine the number of people and perform the security response.

Generally, the processor 102 may be configured to implement the CNN module 190*b* and the camera system 100*i* may be configured to have the processing capabilities to perform the computer vision operations (e.g., detect objects, extract characteristics about the objects, determine a number of people in the video frames, determine when the number of people is greater than a number of entrants permitted by the authorization signal AUTH, etc.) locally. In some embodiments, the camera system 100*i* may be configured to offload the processing of the computer vision operations to the processors 214 and/or the neural network 216 of the cloud service 202. In some embodiments, the camera system 100*i* may be configured to offload the processing of the computer vision operations to the processor 236 and/or the neural network 252 of the access control device 50. For example, the cloud service 202 may comprise scalable resources that may be capable of greater processing than the processor 102 implemented by the camera system 100*i*. In another example, the processor 102 may have access to less power (e.g., powered by the battery 162), while the access control device 50 may be connected to a power outlet for a constant power supply to enable greater resources for performing the computer vision operations. Generally, the computer vision operations may be described as being performed by the processor 102 and the CNN module 190*b*. However, the processors 214 and the neural network 216 of the cloud services 202 and/or the processor 236 and the neural network 252 of the access control device 50 may have similar capabilities. Which operations are performed by which component of the system 200 may be varied according to the design criteria of a particular implementation.

In some embodiments, the memory 160 may be configured to store a full recording (e.g., a full video stream) of the video data captured by the camera system 100*i*. The video frames generated may be processed using the hardware modules 190*a*-190*n* (e.g., to process, encode, adjust, dewarp, perform rolling shutter correction, compress, etc.). The video frames may be analyzed by the CNN module 190*b*. The CNN module 190*b* may comprise an AI model (e.g., the DAG). The CNN module 190*b* may be configured to detect objects, determine a number of people, determine whether a person is attempting to cross the threshold 82, etc. The AI model may be configured to implement the machine readable DAG to detect various objects and/or events.

The CNN module 190*b* may be configured to tag the video frames with metadata. The metadata may comprise a timestamp and/or information about the people detected in the video frames. In one example, the metadata may comprise the number of people detected in the video frames. In another example, the metadata may comprise characteristics about each of the people (e.g., information that may be used for person detection and/or facial recognition). In yet another example, the metadata may comprise movement direction information about each object detected. The type of data tagged in the metadata may be varied according to the design criteria of a particular implementation. In some embodiments, the metadata tags may be used to generate training data (e.g., the metadata tags may be tagged as correct and/or incorrect based on whether the metadata tags accurately identify the objects, events and/or characteristics). The training data may be used to refine the feature set used to detect objects (e.g., to adjust neural network weight values and/or bias values for the AI model).

The CNN module 190*b* may be configured to perform object detection, classify objects, and/or extract data from the video frames. The CNN module 190*b* may compare the data extracted (e.g., various symbols and/or confidence values indicating the likelihood that particular objects were detected) with the detection parameters (e.g., the feature set information) of the signal FEAT according to the machine readable DAG to determine whether or not an object and/or event of interest has been detected. In an example, the feature set signal FEAT may provide instructions for distinguishing between two people that are close together. In some embodiments, the CNN module 190*b* and/or audio analytics modules may determine when an object of interest and/or event has been detected. For example, the event may comprise an amplitude and/or type of audio detected, an event and/or object detected using computer vision operations and/or a combination of audio and video analysis (e.g., using computer vision to detect people and using audio analysis to determine if there is more than one person is making noise, detecting multiple sets of footsteps compared to the number of people visible in the video frames, etc.).

The processor 102 may implement the CNN module 190b. The CNN module 190b may be a hardware component (or multiple hardware components working together) of the processor 102 that implements CNN-based detection techniques (or other types of detection techniques) that operate entirely on the processor 102 to perform computer vision operations such as object detection, object tracking, object classification, facial recognition, etc. The hardware accelerated CNN module 190b may enable the object/event detection to be performed on the camera system 100i (e.g., without relying on computing resources of the cloud server 202 to perform object detection).

In some embodiments, the processor 102 may use software acceleration for computer vision and/or a combination of hardware accelerated and software accelerated computer vision. With computer vision operations running on either a hardware based CNN engine 190b and/or a software based CNN engine, the processor 102 implemented in the edge device 100i may be able to detect the number of people and apply the data to the video frames captured. Performing the computer vision operations locally to the camera system 100i may conserve bandwidth (e.g., the video frames may not need to be communicated to the access control device 50 or the cloud service 202) and/or enable efficient processing (e.g., the video frames may need to be encoded to send to the cloud service 202 and the cloud service 202 may need to transcode the encoded video frames before performing the computer vision operations).

The access control device 50 may be configured to grant access to an authorized user (e.g., the person 60). The camera system 100i may be mounted overhead the door 42 (or with a view of the threshold 82) to the secured area 80. The camera system 100i may implement an ANN and/or use depth data (e.g., captured using a time-of-flight sensor) to detect if there is one person only that is entering the secured area 80 (e.g., compare the number of people authorized by the signal AUTH to the number of people detected in the video frames). If the camera system 100i detects more people than authorized to enter the secured area 80 (e.g., more than one person), the processor 102 may determine that tailgating (or unauthorized access) has been detected. The processor 102 may generate the signal CTRL. The signal CTRL may be configured to report that there has been an unauthorized access to the secured area 80 detected. In an example, the signal CTRL may be presented to the access control device 50, which may trigger alerts and/or notifications.

Figure 6:
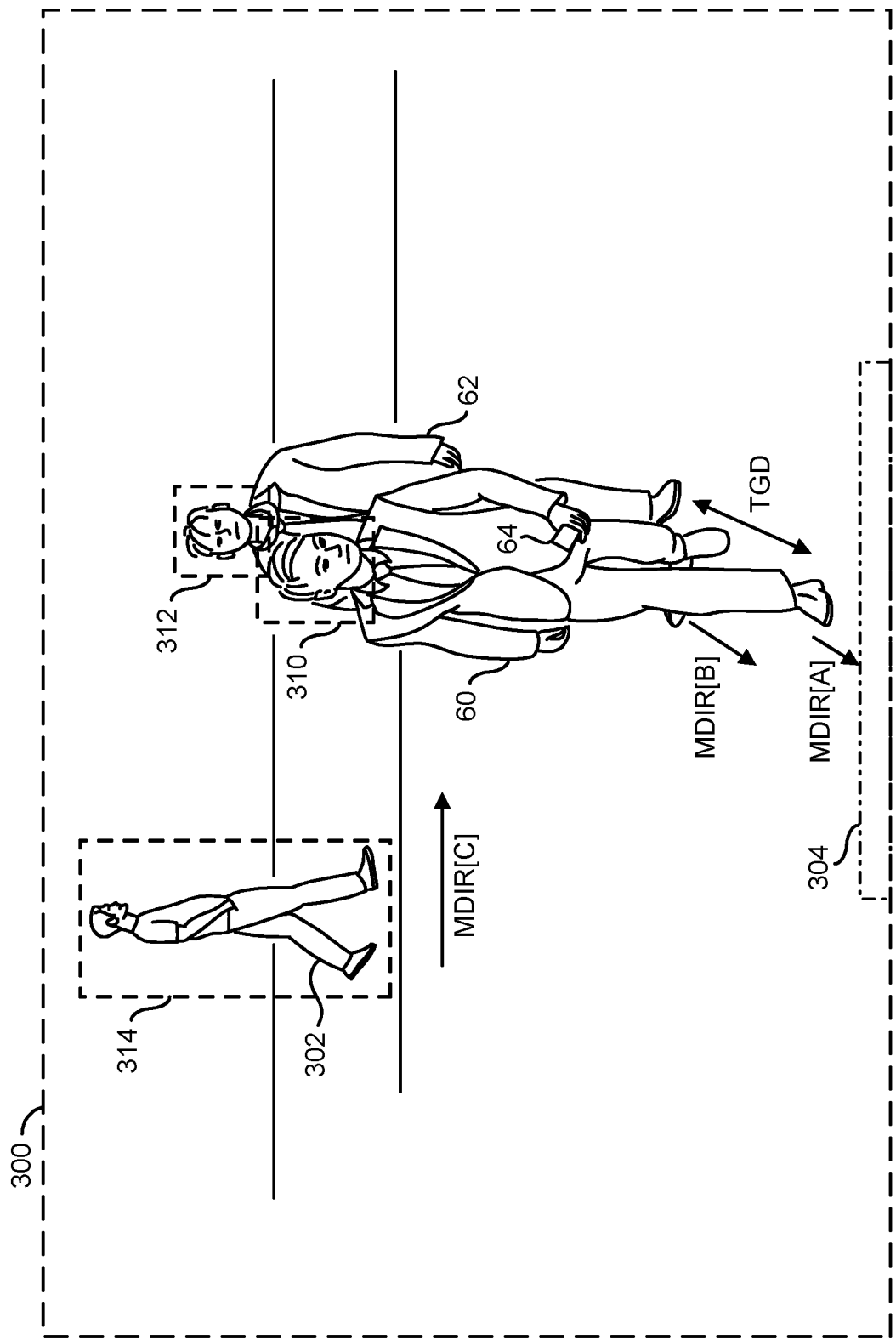
FIG. 6 is a diagram illustrating an example analysis performed on an example video frame to detect tailgating.

Referring to FIG. 6, a diagram illustrating an example analysis performed on an example video frame to detect tailgating is shown. An example video frame 300 is shown. The example video frame 300 may be an illustrative example of one video frame of a sequence of video frames analyzed by the processor 102. The example video frame 300 may comprise pixel data arranged as a video frame provided to the CNN module 190b. The CNN module 190b may be configured to analyze the pixel data of the video frame 300 to determine the number of people present and/or detect tailgating.

The example video frame 300 may be a video captured of entrance of the secured area 80 (e.g., a view from the perspective above the door 42). The example video frame 300 may comprise the authorized person 60, the unauthorized person 62 and a person 302. The authorized person 60 is shown holding the credentials 64. The unauthorized person 62 and the person 302 are shown without the credentials 64. A dotted box 304 is shown. The dotted box 304 may represent the entrance to the secured area 80. In the example shown, the authorized person 60 may be entering the secured area 80, the unauthorized person 62 may attempt to gain illicit access to the secured area 80 by tailgating the authorized person 60 and the person 302 may be an innocent bystander (e.g., walking near the entrance 304 but not attempting to enter the secured area 80). For example, the entrance 304 may be in a hallway and the innocent bystander 302 may be coincidentally walking down the hallway near the entrance 304 when the authorized person 60 requested access to the secured area 80.

Dotted shapes 310-314 are shown. The dotted shapes 310-314 may represent the detection of an object by the computer vision operations performed by the processor 102. The dotted shapes 310-314 may comprise the pixel data corresponding to an object detected by the computer vision operations pipeline and/or the CNN module 190b. The dotted shapes 310-314 are shown for illustrative purposes. In an example, the dotted shapes 310-314 may be visual representations of the object detection (e.g., the dotted shapes 310-314 may not appear on an output video frame). In another example, the dotted shapes 310-314 may be abounding box generated by the processor 102 displayed on the output video frames to indicate that an object has been detected (e.g., the bounding boxes 310-314 may be displayed in a debug mode of operation).

The computer vision operations may be configured to detect characteristics of the detected objects and/or behavior of the objects detected. The characteristics of the objects may comprise a height, length, width, slope, an arc length, a color, an amount of light emitted, detected text on the object, a path of movement, a speed of movement, a direction of movement, a proximity to other objects, etc. The characteristics of the detected object may comprise a status of the object (e.g., opened, closed, on, off, etc.). The behavior may be determined in response to the type of object and/or the characteristics of the objects detected. While one example video frame 300 is shown, the behavior of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 310 may be the face/head of the authorized person 60, the bounding box 312 may be the face/head of the unauthorized person 62 and the bounding box 314 may be the innocent bystander 302. In an example, the settings (e.g., the feature set) for the processor 102 may define objects of interest to be people. For example, trees, plants, decorations, furniture, vehicles may not be objects of interest. In the example shown, the camera system 100i may be configured to detect and/or count the number of people entering the secured area 80. However, in some embodiments, the authorized access may be granted to a particular vehicle (e.g., a secured parking lot) and the processor 102 may be configured to detect the number of vehicles attempting to enter the secured area 80.

Arrows MDIR[A]-MDIR[C] are shown. The arrows MDIR[A]-MDIR[C] may represent a direction of travel of the detected objects 310-314. The arrow MDIR[A] may comprise the direction of movement of the authorized person 60. The arrow MDIR[B] may comprise the direction of movement of the unauthorized person 62. The arrow MDIR[C] may comprise the direction of movement of the innocent bystander 302. The processor 102 may determine the directions of travel MDIR[A]-MDIR[C] by performing the computer vision operations over a sequence of video frames. For example, the example video frame 300 may be one video frame of a sequence of temporally related video frames. The processor 102 may recognize the objects 310-314 as the same objects over the sequence of video frames. By tracking the movement of the objects 310-314 over the multiple video frames, the processor 102 may be configured to determine where the objects 310-314 have moved from and may predict where the objects 310-314 may be moving towards.

The processor 102 may use the directions of travel MDIR[A]-MDIR[C] to determine which of the people detected in the video frame 300 may be attempting to enter the secured area 80. The direction of travel MDIR[A] of the authorized person 60 may be directed towards the entrance 304. The direction of travel MDIR[B] of the unauthorized person 62 may be directed towards the entrance 304. The direction of the travel MDIR[C] of the innocent bystander 302 may be directed away from the entrance 304. Based on the directions of travel MDIR[A]-MDIR[C], the processor 102 may determine that the objects 310-312 may be attempting to enter the secured area 80 and the object 314 may not be attempting to enter the secured area 80.

Based on the direction MDIR[A], the processor 102 may count the authorized person 60 as one person entering the secured area 80. Based on the direction MDIR[B], the processor 102 may count the unauthorized person 62 as one person entering the secured area 80. In embodiments, where the authorization signal AUTH does not provide information about the people that have access to the secured area 80 (e.g., facial recognition data), the processor 102 may not be able to determine that the person 60 is authorized and the person 62 is unauthorized (e.g., the processor 102 may determine that two people are attempting to enter the secured area 80). Based on the direction MDIR[C], the processor 102 may not count the innocent bystander 302 as a person entering the secured area 80. For example, since the person 302 is not attempting to enter the secured area 80, the processor 102 may classify the person 302 as an innocent bystander.

The example video frame 300 may be an example video frame captured after the camera system 100 has received the authentication signal AUTH. In an example, if the authentication signal AUTH indicates that one person has been authorized to enter the secured area 80, then the processor 102 may compare the number of people entering the secured area 80 (e.g., two) to the number authorized (e.g., one). The processor 102 may generate the control signal CTRL to indicate than an unauthorized access has occurred. In another example, if the authentication signal AUTH indicates that two people have been authorized to enter the secured area 80, then the processor 1012 may compare the number of people entering the secured area 80 (e.g., two) to the number authorized (e.g., two). Since no unauthorized access has been detected, the processor 102 may not generate the signal CTRL. In some embodiments, even when there is no unauthorized access detected, the processor 102 may generate the signal CTRL (e.g., to provide the access control device 50 with a record of the number of people detected at a particular time).

A double-ended arrow TGD is shown. The double-ended arrow TGD may represent a distance. The distance TGD may comprise the distance between the authorized person 60 and the unauthorized person 62. In some embodiments, the processor 102 may be configured to determine the distance between two people. For example, the processor 102 may be configured to count a number of pixels between the authorized person 60 and the unauthorized person 62 to determine the distance TGD. In another example, the processor 102 may be configured to compare relative sizes of the object 310 and the object 312 to reference objects and use the relative sizes to determine the distance TGD. In some embodiments, the processor 102 may receive depth data from a time-of-flight sensor and/or disparity images from a stereo camera to determine the distance TGD. In some embodiments, to prevent unnecessary calculations (e.g., conserve power and/or ensure resources are free for other operations), the processor 102 may not determine the distance TGD unless both the object 310 and the object 312 are both determined to be entering the secured area 80 (e.g., the direction MDIR[A] and the direction MDIR[B] are both directed towards the entrance 304). For example, the distance TGD may not necessarily be calculated between the object 310 and the innocent bystander 314. The method of determining the distance TGD may be varied according to the design criteria of a particular implementation.

The processor 102 may be configured to compare the distance TGD to a threshold distance. If the distance TGD is less than the threshold distance, the processor 102 may determine that there may be tailgating (e.g., increase a confidence level of tailgating). If the distance TGD is greater than the threshold distance, the processor 102 may determine that there may not be tailgating (e.g., decrease a confidence level of tailgating). The threshold distance for tailgating may be stored by the memory 160 and/or may be part of the feature set. The threshold distance for tailgating may be a pre-configured value (e.g., based on prior knowledge of tailgating attempts, based on information about how close people walk to each other, etc.).

The processor 102 may be configured to aggregate information from various types of detection operations. In an example, the distance TGD alone may not be indicative of tailgating (e.g., the person 62 may also have proper credentials and may be waiting in line behind the authorized person 60 to present credentials). Similarly, the directions of travel MDIR[A]-MDIR[C] alone may not be indicative of who is entering the secured area 80 (e.g., the person 302 may be intentionally hanging back to appear innocent and then quickly attempt to tailgate once the door 42 has been opened). The distance TGD and/or the directions of travel MDIR[A]-MDIR[C] may each comprise one factor of detecting tailgating. Each of the detection factors may contribute to a confidence level that the processor 102 may apply to each of the people detected in the video frame. The confidence level may be increased when a detection factor indicates unauthorized access (e.g., the direction of travel is towards the entrance 304, the distance TGD, etc.) and similarly decreased when the detection factor does not indicate unauthorized access. The processor 102 may determine whether each of the people detected in the video frame 300 is attempting unauthorized access based on the confidence level determined. The confidence level may be a pre-configured threshold value. The confidence level may be set based on a sensitivity level (or a security level) selected by an operator and/or an owner of the secured area 80 (e.g., a higher sensitivity level may result in a lower confidence level threshold, which may result in more detections of tailgating). The setting for the confidence level may be varied according to the design criteria of a particular implementation.

The example video frame 300 may be tagged in response to the CNN module 190b determining the number of people. For example, the detection of the authorized person 60, the detection of the unauthorized person 62 and/or the innocent bystander 302 may result in the processor 102 generating a metadata tag (e.g., corresponding to the total number of people in the video frame 300). The metadata tag may further indicate the number of people attempting to enter the secured area 80 (e.g., two people attempting to enter and one bystander not attempting to enter). Other data, such as a timestamp and/or locations of the bounding boxes 310-314 may be part of the metadata tagged for the video frame 300. The metadata may comprise multiple tags (e.g., one metadata tag for detecting the authorized person 60, another metadata tag for detecting the unauthorized person 62, another metadata tag for detecting the innocent bystander 302, one tag for the each of the directions MDIR[A]-MDIR[C], one metadata tag for the distance TGD, etc.). The number of metadata tags and/or the type of data stored with the metadata may be varied according to the design criteria of a particular implementation.

Figure 7:
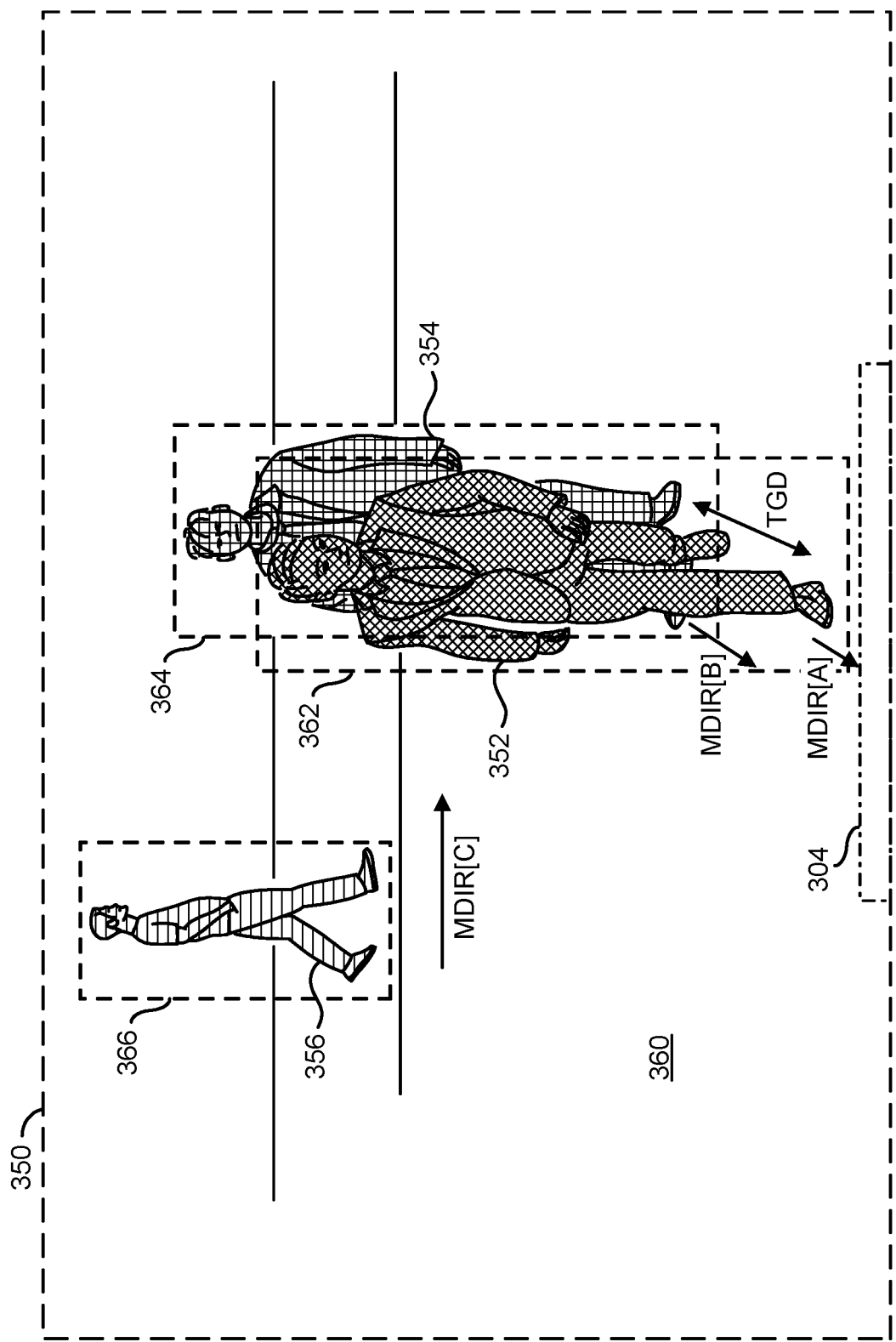
FIG. 7 is a diagram illustrating an example analysis performed on example time-of-flight data.

Referring to FIG. 7, a diagram illustrating an example analysis performed on example time-of-flight data is shown. Example depth data 350 is shown. The depth data 350 may be captured by the sensor 152 of the capture device 100. In an example, the sensor 152 may implement a time-of-flight sensor. In another example, the depth data 350 may comprise disparity information generated in response to a pair of stereo images captured by a stereo camera.

The depth data 350 may comprise the same area near the secured area 80 as shown in the example video frame 300 shown in association with FIG. 6. The entrance 304 is shown at the same general location as shown in the example video frame 300. However, the depth data 350 may not be images of the authorized person 60, the unauthorized person 62 and/or the innocent bystander 304. In one example, the depth data 350 may comprise data points based on distance readings from the time-of-flight sensor 152. In another example, the depth data 350 may comprise data points based on disparity calculations performed using a pair of stereo images captured by two of the capture devices 104a-104n arranged as a stereo pair of cameras. The depth data 350 shown may be a visual representation of the depth data for illustrative purposes. The data points may be used by the processor 102 to infer the detection of people and/or objects.

The depth data 350 may comprise a data point group 352, a data point group 354 and/or a data point group 356. The data point group 352 may comprise a cluster of data points that correspond to a similar distance. The data point group 354 may comprise a cluster of data points that correspond to a similar distance and a distance that may be distinct from the data point group 352. The data point group 356 may comprise a cluster of data points that correspond to a similar distance and a distance that may be distinct from the data point groups 352-354.

An area 360 is shown. The area 360 may comprise a baseline region. The baseline region 360 may comprise the depth data of the area near the secured area 80 when no objects are present. The baseline region 360 may comprise reference distances. The processor 102 may be configured to compare the data point groups 352-356 to the baseline region 360. The differences between the data point groups 352-356 and the baseline region 360 may enable the processor 102 to detect objects using the depth data 350.

The processor 102 may use the baseline region 360 and the data point groups 352-356 to distinguish between various objects near the secured area 80. Dotted boxes 362-366 are shown. The dotted boxes 362-366 may comprise the distinct depth objects that the processor 102 may have detected based on the baseline region 360 and the data point groups 352-356. The depth object 362 may correspond to the authorized person 60. The depth object 364 may correspond to the unauthorized person 62. The depth object 366 may correspond to the innocent bystander 302.

The data point group 352 may be closer to the time-of-flight sensor 152 (or the stereo camera) than the data point group 354. The data point group 356 may be farther away from the time-of-flight sensor 152 (or the stereo camera) than both the data point groups 352-354. Based on the relative distances between the data point groups 352-356, the processor 102 may determine that the depth object 362 may be closest to the entrance 304, the depth object 364 may be the next closest to the entrance 304 and the depth object 366 may be farthest away from the entrance 304. In an example, based on the relative distances between the data point group 352 and the data point group 354, the processor 102 may determine the distance TGD between the depth object 362 and the depth object 364.

The processor 102 may be configured to analyze the depth data 350 captured over time. For example, the processor 102 may analyze the changes in distance and/or locations of the depth objects 362-366 over a sequence of temporally related snapshots of depth data captured. By analyzing the distance and/or locations of the depth objects 362-366 over time, the processor 102 may be configured to determine the direction of movement MDIR[A]-MDIR[C].

Using the distance TGD and/or the direction of movement MDIR[A]-MDIR[C] extracted from the depth data 350, the processor 102 may be configured to determine the number of people located near the secured area 80. Similar to the confidence level calculations performed based on the computer vision operations on the video frames, the processor 102 may be configured to determine the number of people attempting the enter the secured area 80 based on the depth data 350. The processor 102 may receive the authorization signal AUTH to determine the number of people expected to enter the secured area 80. Then the processor 102 may analyze the depth data 350 to determine the number of people attempting to enter the secured area 80. The processor 102 may detect the people based on the depth objects 362-366 detected. If the number of people attempting to enter the secured area 80 does not match the number of people authorized by the access control device 50, then the processor 102 may generate the control signal CTRL to indicate that an unauthorized access has occurred.

In some embodiments, the camera system 100 may implement the time-of-flight sensor 152 instead of the capture devices 104a-104n. For example, analysis of the time-of-flight data may be performed to determine the number of people entering the secured area 80 instead of using computer vision operations on video frames captured. In some embodiments, the camera system 100 may implement the capture devices 104a-104n without the time-of-flight sensor 152. For example, the processor 102 may determine the number of people detected based on the computer vision operations without using depth data. In some embodiments, the camera system 100 may comprise the capture devices 104a-104n and the time-of-flight sensor 152. The processor 102 may determine the number of people attempting to enter the secured area 80 based on both the computer vision operations and analyzing the depth data. In some embodiments, the processor 102 may determine the number of people attempting to enter the secured area 80 using each of computer vision operations, depth data generated from the time-of-flight sensor 152 and depth data generated from disparity images. For example, the camera system 100 may implement sensor fusion to detect the people entering the secured area 80 based on at least two disparate sources of information (e.g., the computer vision operations and the depth data). The computer vision operations may detect the number of people entering the secured area 80 and the detection of people using the depth data may be used to adjust the confidence level for the number of people. For example, if the depth data provides a confirmation of the number of people detected by the computer vision operations, then the confidence level may be increased.

Figure 8:
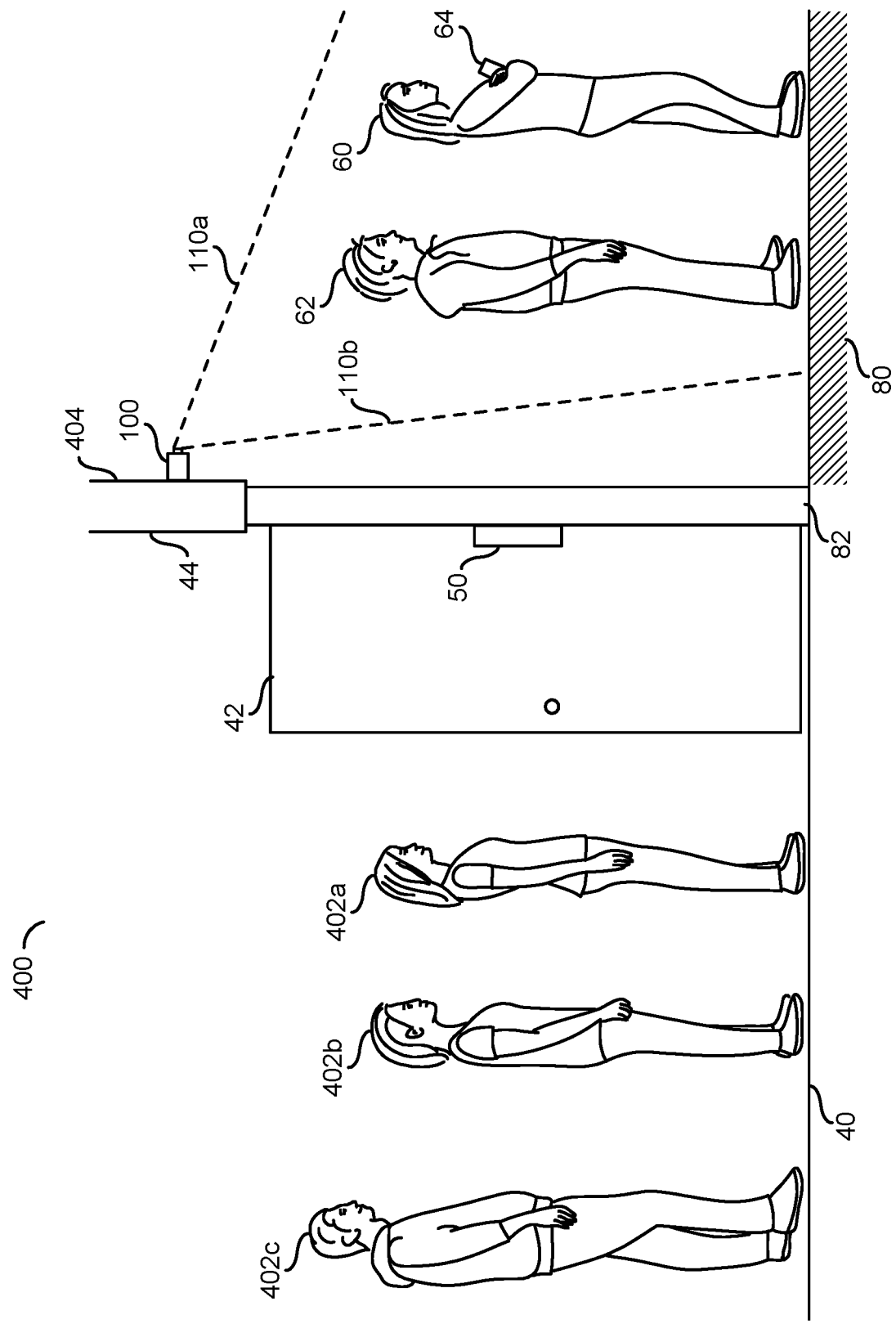
FIG. 8 is a diagram illustrating implementing tailgate detection inside a secured area.

Referring to FIG. 8, a diagram illustrating implementing tailgate detection inside a secured area is shown. An example scenario 400 is shown. The example scenario 400 may comprise a side view of the location 40, the door 42, the wall 44, the access control device 50, the secured area 80, the threshold 82 and/or the camera system 100. The person 60 and the person 62 are shown within the secured area 80. The person 60 is shown holding the credentials 64. People 402a-402c may be located in the location 40 (e.g., not within the secured area 80).

In the example scenario 400 the camera system 100 may be mounted within the secured area 80 on an interior wall 404. The interior wall 404 may be a wall within the secured area 80. In the example shown in association with FIGS. 1-2, the camera system 100 may be mounted to the wall 44 and/or the wall 70 within the location 40 (e.g., outside of the secured area 80). In the example shown in association with FIG. 8, the camera system 100 may be mounted within the secured area 80.

The people 402a-402c may be people waiting to enter the secured area 80. For example, the people 402a-402c may be waiting in a queue to present credentials to the access control device 50 before crossing the threshold 82 to enter the secured area 80. In the example shown, the person 402a may present credentials to the access control device 50, the door 42 may be unlocked and opened, and the person 402a may cross the threshold 82 to enter the secured area 80, then the person 402b may present credentials to the access control device 50, etc. In the example shown in association with FIGS. 1-2, with the camera system 100 mounted to the wall 44 and/or the wall 70, the camera system 100 may perform the computer vision operations to detect tailgating attempts before the people 402a-402c enter the secured area 80.

In the example shown, with the camera system 100 mounted to the interior wall 404, the field of view 110a-110b may capture pixel data of people already within the secured area 80. The person 60 and the person 62 within the secured area 80 are shown within the field of view 110a-110b. The camera system 100 may be configured to perform the computer vision operations to determine whether the person 62 is attempting to tailgate the person 60 in order to enter the secured area 80 without authorization.

In an example, the person 60 may be an authorized user that may present the credentials 64 to the access control device 50 and cross the threshold 82 to enter the secured area 80. When the authorized person 60 enters the secured area 80, the camera system 100 may detect the authorized person 60 in the field of view 110a-110b. If the authorization signal AUTH generated by the access control device 50 in response to detecting the credentials 64 of the authorized person 60 indicates that one person has been allowed to enter the secured area 80, then the camera system 100 may detect one person and determine that the number of people that has entered the secured area 80 matches the number of people authorized.

In one example, the person 62 may be an unauthorized user that may attempt to tailgate the authorized person 60 into the secured area 80 to avoid being locked out by the access control device 50. When the unauthorized person 62 enters the secured area 80 close behind the authorized person 60, both the authorized person 60 and the unauthorized person 62 may be detected by the camera 100 in the field of view 110a-110b. If the authorization signal AUTH generated by the access control device 50 in response to detecting the credentials 64 of the authorized person 60 indicates that one person has been allowed to enter the secured area 80, then the camera system 100 may detect two people and determine that the number of people that has entered the secured area 80 is greater than the number of people authorized. The camera system 100 may generate the signal CTRL to initiate a security response in response to the number of people detected.

In another example, the person 62 may be an authorized user that may invited by the authorized person 60 into the secured area 80 (e.g., the person 62 may be an authorized guest that does not have the credentials 64 but may be authorized by the person 60). When the guest 62 enters the secured area 80 close behind the authorized person 60, both the authorized person 60 and the guest 62 may be detected by the camera 100 in the field of view 110a-110b. If the authorization signal AUTH generated by the access control device 50 in response to detecting the credentials 64 of the authorized person 60 indicates that two people have been allowed to enter the secured area 80, then the camera system 100 may detect two people and determine that the number of people that has entered the secured area 80 matches the number of people authorized.

In some embodiments, the feature set operating on the camera system 100 may comprise a number of approved faces. The camera system 100 may be configured to perform computer vision operations on the person 60 and the person 62 within the secured area to determine whether faces of the person 60 and the person 62 match the approved faces in the feature set. The signal CTRL may be generated to initiate a security measure if one of the faces detected does not match the approved faces. Similarly, if the credentials 64 of the person 60 enables a guest to be allowed within the secured area 80, then the camera system 100 may compare the number of unknown faces detected with the number of guests detected within the secured area 80. For example, if the credentials 64 of the person 60 enables one guest to be within the secured area 80 with the person 60, then the camera system 100 may not generate the signal CTRL in response to detecting one unknown face within the secured area 80. In another example, if the credentials 64 of the person 60 enables one guest to be within the secured area 80 with the person 60, then the camera system 100 may generate the signal CTRL in response to detecting two unknown faces within the secured area 80. When configured to detect faces of people within the secured area 80, the camera system 100 may be mounted to another wall within the secured area 80 to enable a better vantage point to capture faces of the person 60 and the person 62.

Embodiments of the camera system 100 may be configured to detect people attempting to enter the secured area 80 before they enter the secured area 80 as shown in association with FIGS. 1-2 (e.g., the access control reader 50 with the sensor 52 implemented as a camera built-in (e.g., similar to a video doorbell). Embodiments of the camera system 100 may be configured to detect people after they enter the secured area 80. For example, the access control device 50 may be in the location 40 (e.g., on the unsecured wall 44) and the time-of-flight sensor 152 may be mounted on the ceiling or on the other side on the interior wall 404 (e.g., within the secured area 80) and configured to look down for counting the entrants. If the access control reader 50 granted access to an authorized person, then immediately the camera system 100 may see greater than one person and a violation of the rules may be detected.

Figure 9:
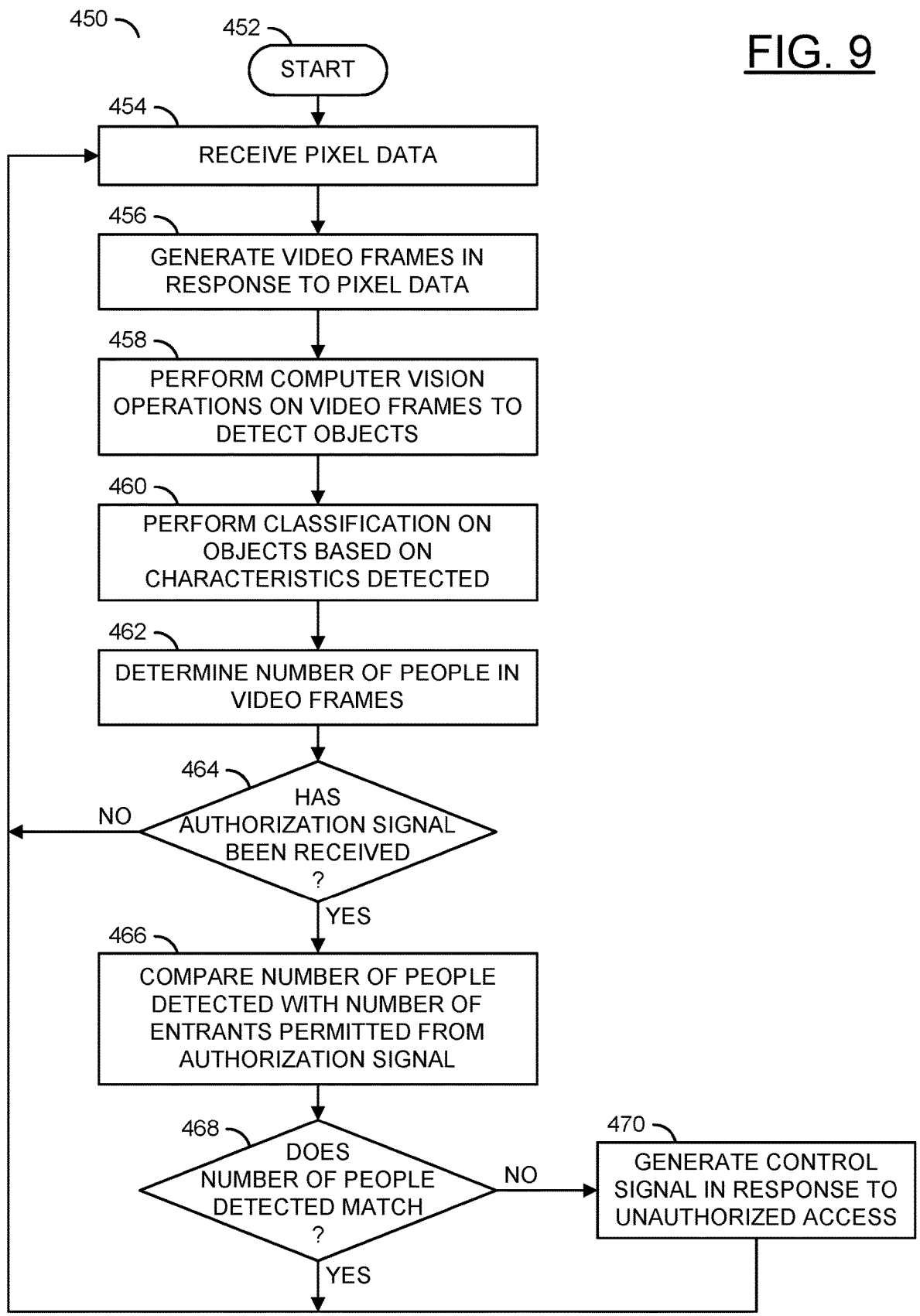
FIG. 9 is a flow diagram illustrating a method for implementing anti-tailgating for access control.

Referring to FIG. 9, a method (or process) 450 is shown. The method 450 may implement anti-tailgating for access control. The method 450 generally comprises a step (or state) 452, a step (or state) 454, a step (or state) 456, a step (or state) 458, a step (or state) 460, a step (or state) 462, a decision step (or state) 464, a step (or state) 466, a decision step (or state) 468, and a step (or state) 470.

The step 452 may start the method 450. In the step 454, the processor 102 may receive pixel data. One or more of the capture devices 104a-104n may present the signals PIXELD_A-PIXELD_N to the processor 102. The pixel data captured may comprise the area within the field of view 110a-110b (e.g., of the location 40, of the threshold 82, of within the secured area 80, etc.). Next, in the step 456, the processor 102 may generate video frames from the pixel data. For example, one or more of the dedicated hardware modules 190a-190n may generate video frames from the signals PIXELD_A-PIXELD_N. Next, the method 450 may move to the step 458.

In the step 458, the processor 102 may perform computer vision operations on the video frames. In an example, the CNN module 190b may receive the video frames as generated to enable real-time computer vision operations. Next, in the step 460, the CNN module 190b may perform object detection and/or determine the characteristics of the objects detected. The object detection, along with classification and/or segmentation may be part of the computer vision operations performed by the CNN module 190b. In the step 462, the CNN module 190b may determine the number of people detected in the video frames. The number of people may be determined in response to the characteristics and/or classifications performed using the computer vision operations. Next, the method 450 may move to the decision step 464.

In the decision step 464, the processor 102 may determine whether the authorization signal AUTH has been detected. The authorization signal AUTH may be communicated by the access control device 50 (e.g., a wireless signal received by the communication device 156 or a signal received via the physical connection 222). The authorization signal AUTH may indicate that a person (or people) has been allowed into the secured area 80 and/or may indicate the number of people allowed to enter. If the authorization signal AUTH has not been received, then the method 450 may return to the step 454. If the authorization signal AUTH has been received, then the method 450 may move to the step 466. In the step 466, the processor 102 may compare the number of people detected by using the computer vision operations with the number of people permitted to enter provided by the authorization signal AUTH. Next, the method 450 may move to the decision step 468.

In the decision step 468, the processor 102 may determine whether the number of people detected matches the number of people authorized by the authorization signal AUTH. In an example, one person may be allowed to enter when the credentials 64 are provided to the access control device 50 and the processor 102 may determine whether more than one person attempted to enter the secured area 80. If the number of people detected does match, then the method 450 may return to the step 454 (e.g., tailgating may not have been detected). If the number of people detected does not match, then the method 450 may move to the step 470. In the step 470, the processor 102 may generate the control signal CTRL in response to detecting the unauthorized access. In some embodiments, the control signal CTRL may be used by the camera system 100 to generate a security response. In some embodiments, the control signal CTRL may be communicated to the access control device 50 and/or the cloud service 202 to determine a security response. Next, the method 450 may return to the step 454.

Figure 10:
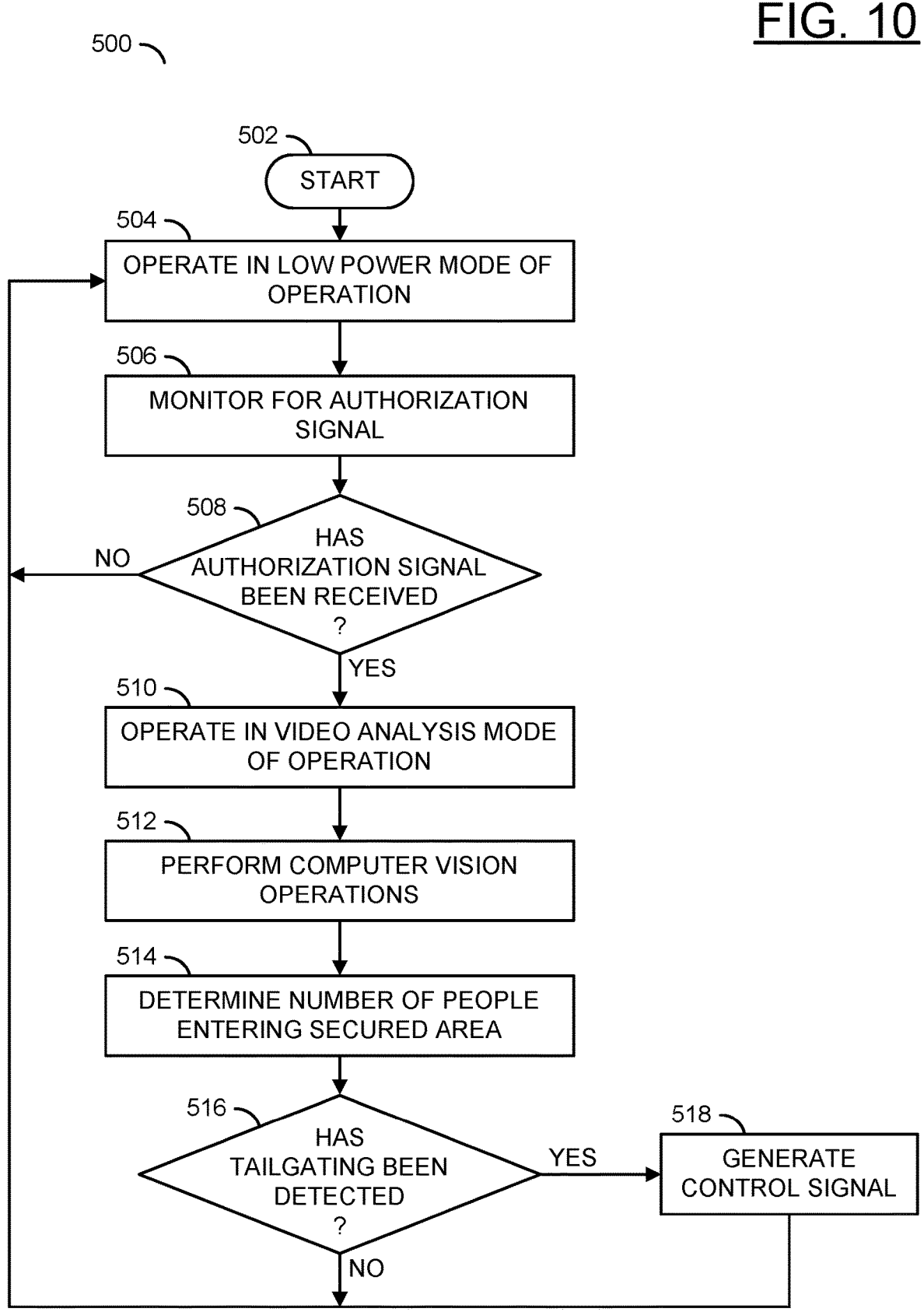
FIG. 10 is a flow diagram illustrating a method for changing between modes of operation in response to an authorization signal.

Referring to FIG. 10, a method (or process) 500 is shown. The method 500 may change between modes of operation in response to an authorization signal. The method 500 generally comprises a step (or state) 502, a step (or state) 504, a step (or state) 506, a decision step (or state) 508, a step (or state) 510, a step (or state) 512, a step (or state) 514, a decision step (or state) 516, and a step (or state) 518.

The step 502 may start the method 500. In the step 504, the camera system 100 may operate in a low power mode of operation. In an example, in the low power mode of operation, the camera system 100 may not perform the computer vision operations. In another example, in the low power mode of operation, the camera system 100 may not capture pixel data. Next, in the step 506, the communication device 156 may monitor for the authorization signal AUTH. In an example, in the low power mode of operation, the camera system 100 may operate with sufficient power to enable the communication device 156 to monitor for the authorization signal AUTH, but put other functionality in a sleep mode to conserve power. Next, the method 500 may move to the decision step 508.

In the decision step 508, the processor 102 may determine whether the authorization signal AUTH has been received. If the authorization signal AUTH has not been received, then the method 500 may return to the step 504 (e.g., remain in the low power mode of operation). If the authorization signal AUTH has been received, then the method 500 may move to the step 510. In the step 510, the camera system 100 may change modes of operation to operate in the video analysis mode of operation. In an example, the processor 102 may activate functionality (e.g., wake up) to enable the capture devices 104a-104n to capture video data and the CNN module 190b to perform the computer vision operations. Next, in the step 512, the CNN module 190b may perform the computer vision operations on the pixel data arranged as video frames. In the step 514, the CNN module 190b may determine the number of people entering the secured area 80. Next, the method 500 may move to the decision step 516.

In the decision step 516, the processor 102 may determine whether tailgating has been detected. In an example, tailgating may be determined by comparing the number of people entering the secured area to the number of people authorized. In another example, the tailgating may be detected based on a spatial relationship between people attempting to enter the secured area 80 (e.g., walking closer than a threshold distance). In yet another example, the tailgating may be detected based on a behavior of people attempting to enter the secured area 80 (e.g., quickly changing direction to follow another person, attempting to hide behind another person, hiding a face, etc.). If tailgating has not been detected, then the method 500 may return to the step 504. For example, the processor 102 may set the camera system 100 to operate in the low power mode of operation if there are no longer people attempting to access the secured area 80. In the decision step 516, if tailgating has been detected, then the method 500 may move to the step 518. In the step 518, the processor 102 may generate the control signal CTRL. Next, the method 500 may return to the step 504.

Figure 11:
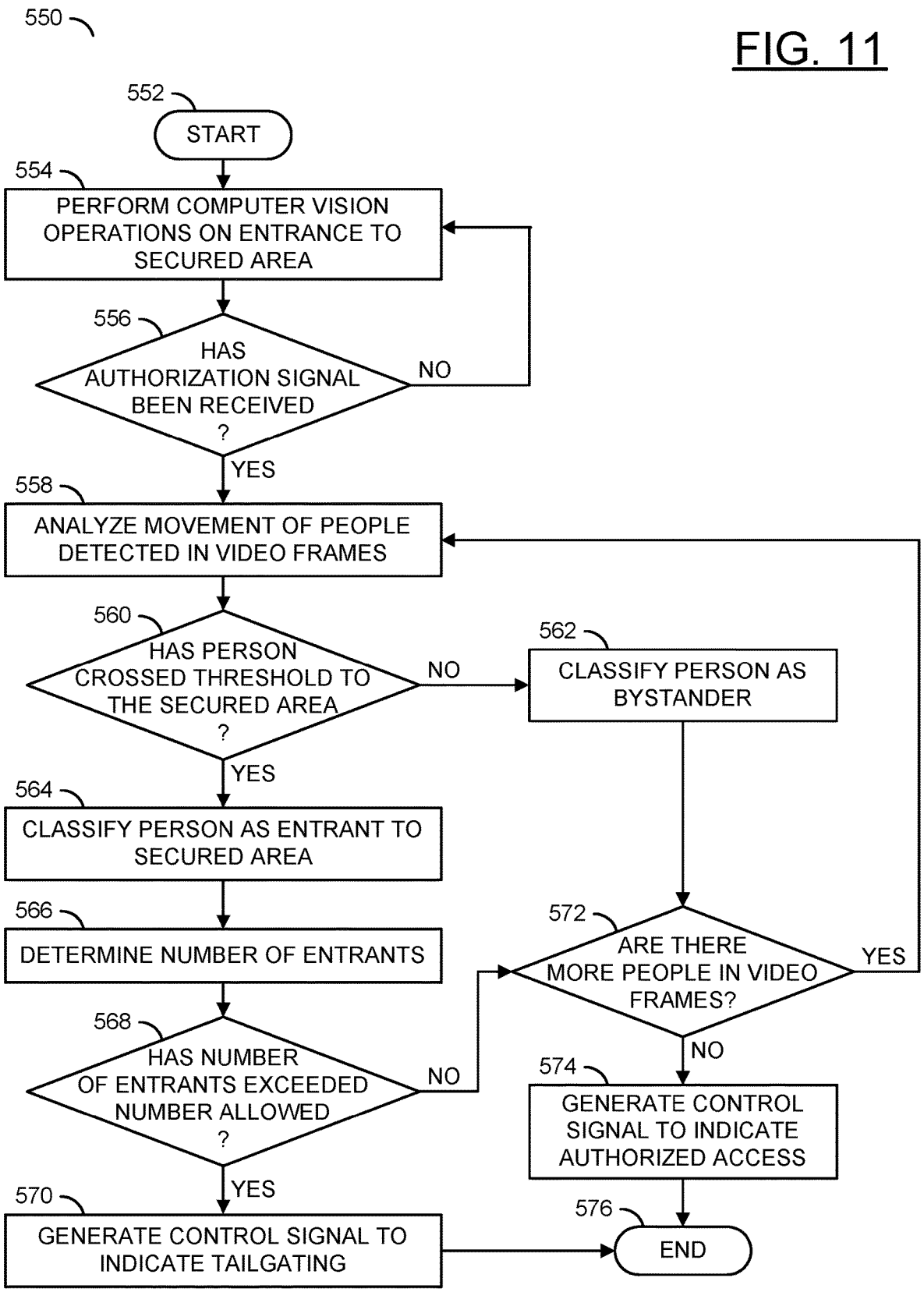
FIG. 11 is a flow diagram illustrating a method for detecting entrants to a secured area.

Referring to FIG. 11, a method (or process) 550 is shown. The method 550 may detect entrants to a secured area. The method 550 generally comprises a step (or state) 552, a step (or state) 554, a decision step (or state) 556, a step (or state) 558, a decision step (or state) 560, a step (or state) 562, a step (or state) 564, a step (or state) 566, a decision step (or state) 568, a step (or state) 570, a decision step (or state) 572, a step (or state) 574, and a step (or state) 576.

The step 552 may start the method 550. In the step 554, the processor 102 may perform the computer vision operations on the entrance (e.g., the threshold 82) to the secured area 80. Next, the method 550 may move to the decision step 556.

In the decision step 556, the processor 102 may determine whether the authorization signal AUTH has been received. If the authorization signal AUTH has not been received, then the method 550 may return to the step 554. If the authorization signal AUTH has been received, then the method 550 may move to the step 558. In the step 558, the processor 102 may analyze the movement of the people (e.g., distinguish between the authorized person 60, the potential tailgater 62 and/or the bystander 314) in the captured video frames. Next, the method 550 may move to the decision step 560.

In the decision step 560, the processor 102 may determine whether the person detected has crossed the threshold 82 to the secured area 80. If the person detected has not crossed the threshold 82 into the secured area 80, then the method 550 may move to the step 562. In the step 562, the processor 102 may classify the person as a bystander. Next, the method 550 may move to the decision step 572. In the decision step 560, if the detected person has crossed the threshold 82 into the secured area 80, then the method 550 may move to the step 564. In the step 564, the processor 102 may classify the person detected crossing the threshold 82 into the secured area 80 as an entrant of the secured area 80. Next, in the step 566, the processor 102 may determine the number of entrants. For example, the processor 102 may increment the total number of entrants. In one example, the processor 102 may track the total number of entrants into the secured area 80 (e.g., a total number of people within the secured area 80 over a particular time frame such as a day, a work shift, an hour, etc.). In another example, the processor 102 may track the number of entrants into the secured area 80 separately for each time the authorization signal AUTH has been received (e.g., clear the counter each time the credentials 64 are received). Next, the method 550 may move to the decision step 568.

In the decision step 568, the processor 102 may determine whether the number of entrants detected exceeds the number of entrants allowed. If the number detected does exceed the number allowed, then the method 550 may move to the step 570. In the step 570, the processor 102 may generate the signal CTRL to indicate that an occurrence of tailgating has been detected. Next, the method 550 may move to the step 576. In the decision step 568, if the processor 102 determines that the number of entrants detected exceeds the number allowed, then the method 550 may move to the decision step 572.

In the decision step 572, the processor 102 may determine whether there are more people detected in the video frames. If there are more people detected in the video frames, then the processor 102 may return to the step 558 (e.g., continue to classify the people to determine whether the people are entrants or bystanders). If there are no more people detected in the video frames, then the processor 102 may move to the step 574. In the step 574, the processor 102 may generate the control signal CTRL to indicate that there has been an authorized access (e.g., no security issue has been detected). For example, if the number of people attempting to enter the secured area 80 has not exceeded the number of people allowed, and there are no other people attempting to enter, then the processor 102 may determine that no tailgaters have been detected and/or the appropriate number of people have entered the secured area 80. Next, the method 550 may move to the step 576. The step 576 may end the method 550. While the steps 552-576 for analyzing multiple people in the video frames are shown as being performed sequentially in the method 550, the processor 102 may be configured to analyze each object and/or person detected in the video frames in parallel and/or substantially in parallel.

Referring to FIG. 12, a method (or process) 600 is shown. The method 600 may detect entrants that have entered the secured area. The method 600 generally comprises a step (or state) 602, a decision step (or state) 604, a step (or state) 606, a step (or state) 608, a step (or state) 610, a step (or state) 612, a step (or state) 614, a decision step (or state) 616, a step (or state) 618, a decision step (or state) 620, a step (or state) 622, and a step (or state) 624.

The step 602 may start the method 600. Next, in the decision step 604, the processor 102 may determine whether a next authorization signal has been received. In an example, the camera system 100 may be mounted within the secured area 80 and the access control device 50 may be located outside of the secured area 80. If the authorization signal AUTH has not been received, then the method 600 may move to the step 610. If the authorization signal AUTH has been received, then the method 600 may move to the step 606. In the step 606, the processor 102 may determine the number of entrants authorized to enter the secured area 80 provided by the authorization signal AUTH. Next, in the step 608, the processor 102 may reset a counter. The counter may be configured to track and/or tally the number of people that enter the secured area 80 after the authorization signal AUTH has been received. Next, the method 600 may move to the step 610.

In the step 610, the camera system 100 may capture the video frames within the secured area 80. In an example, the field of view 110a-110b may be directed to capture people as they walk into the secured area 80 as shown in association with FIG. 8. Next, in the step 612, the communication device 156 may communicate the video frames to the cloud computing service 202. In the step 614, the camera system 100 may receive results of the computer vision operations performed by the cloud computing service 202. The steps 612-614 may be optional. In one example, the processor 102 may be configured to perform the computer vision operations locally, and the steps 612-614 may not be implemented. In another example, the camera system 100 may rely on the processors 214 of the cloud computing service 202 to perform the computer vision operations and the camera system 100 may stream the captured video frames to the cloud computing service 202 and may receive the results (e.g., the number of people detected) of the computer vision operations from the cloud computing service 202. Next, the method 600 may move to the decision step 616.

In the decision step 616, the processor 102 may determine whether the computer vision results indicate that a person has been detected. If no person has been detected, then the method 600 may return to the decision step 604. If a person has been detected, then the method 600 may move to the step 618. In the step 618, the processor 102 may increment the counter by the number of people detected. In an example, each person detected may increment the counter by one. Next, the method 600 may move to the decision step 620.

In the decision step 620, the processor 102 may determine whether the number of entrants detected exceeds the limit for authorized users for the authorization signal AUTH. If the limit has not been exceeded, then the method 600 may return to the decision step 604. The camera system 100 may continue to analyze for new entrants until either the limit has been exceeded or a next authorization signal has been received. When the next authorization signal has been received, then the counter may be reset and the processor 102 may determine that an appropriate number of people have entered the secured area 80 in response to the previous authorization signal.

In the decision step 620, if the limit on the number of entrants has been exceeded for the authorization signal AUTH, then the method 600 may move to the step 622. In the step 622, the processor 102 may generate the control signal CTRL. Next, the method 600 may move to the step 624. The step 624 may end the method 600.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"–"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"–"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to an entrance of a secured area; and
   a processor configured to (i) process said pixel data arranged as video frames, (ii) perform computer vision operations to detect objects in said video frames, (iii) extract characteristics about said objects detected to determine whether each person in said video frames is attempting to enter said secured area, (iv) determine a number of people in said video frames attempting to enter said secured area based on said characteristics extracted, (v) receive an authorization signal from an access control device and (vi) generate a control signal, wherein
  (a) said authorization signal is used by said access control device to grant access to said secured area,
  (b) said number of people in said video frames is determined after said authorization signal is received,
  (c) said control signal is generated when said number of people is greater than a number of entrants permitted into said secured area by said authorization signal,
  (d) said person detected in said video frames is included in said number of people attempting to enter said secured area based on (i) a direction of travel of said person with respect to a location of said entrance to said secured area and (ii) a comparison of a number of pixels measured between said person and a second person, and
  (e) said control signal provides an indication of unauthorized access to said secured area.

2. The apparatus according to claim 1, wherein said computer vision operations are performed by (a) applying a feature detection window to each of a plurality of layers in each of said video frames and (b) sliding said feature detection window along each of said plurality of layers.

3. The apparatus according to claim 2, wherein said computer vision operations further comprise applying a convolution operation using matrix multiplication of said plurality of layers defined by said feature detection window.

4. The apparatus according to claim 2, wherein said computer vision operations further comprise (i) performing feature extraction based on weight values for each of said plurality of layers in said video frames and (ii) said weight values are determined by said processor analyzing training data prior to said feature extraction.

5. The apparatus according to claim 1, wherein said computer vision operations comprise analyzing at least one of (a) depth information and (b) disparity information to distinguish between said objects to determine said number of people in said video frames.

6. The apparatus according to claim 1, wherein determining said number of people in said video frames enables said processor to determine whether said person is attempting to gain unauthorized access to said secured area by tailgating said second person that has been allowed access into said secured area by said access control device.

7. The apparatus according to claim 1, wherein (i) said apparatus is configured to operate in a first mode of operation until said authorization signal is received, (ii) said apparatus is configured to consume less power in said first mode of operation compared to a second mode of operation that determines said number of people in said video frames.

8. The apparatus according to claim 1, wherein said apparatus is implemented as an accessory configured to be plugged into said access control device.

9. The apparatus according to claim 1, wherein said apparatus is implemented as a standalone device configured to communicate with said access control device.

10. The apparatus according to claim 1, wherein said control signal is configured to generate an alarm.

11. The apparatus according to claim 1, wherein (i) said control signal is communicated to said access control device and (ii) said access control device is configured to generate a security measure in response to said control signal.

12. The apparatus according to claim 1, wherein (i) said apparatus is mounted over a door, (ii) said door provides said entrance to said secured area and (iii) said door is unlocked by said access control device in response to said authorization signal.

13. The apparatus according to claim 1, wherein (i) said apparatus is mounted at a location and directed to capture within a field of view of said pixel data (a) a door and (b) said access control device, (ii) said door provides said entrance to said secured area and (iii) said door is unlocked by said access control device in response to said authorization signal.

14. The apparatus according to claim 1, wherein said control signal is generated when said number of people in said video frames is greater than one.

15. The apparatus according to claim 1, wherein (i) said processor is further configured to detect people that cross an entrance threshold into said secured area and (ii) said number of people in said video frames comprises a count of said people that cross said entrance threshold into said secured area.

16. The apparatus according to claim 1, wherein (i) said control signal is configured to communicate a running tally of people in said secured area to said access control device and (ii) said running tally of people enables said access control device to determine a total number of people within said secured area.

17. The apparatus according to claim 1, wherein (i) said apparatus is mounted within said secured area and (ii) said processor is configured to (a) detect said number of people after said people have entered said secured area and (b) compare said number of people detected to said number of entrants permitted into said secured area by said authorization signal.

18. The apparatus according to claim 17, wherein said number of people detected is reset in response to receiving said authorization signal.

19. The apparatus according to claim 1, wherein said apparatus is configured to implement a sensor for said access control device for anti-tailgating applications.

20. The apparatus according to claim 1, wherein (a) said processor is further configured to (i) generate a tailgating confidence level for each of said people, (ii) include said person in said number of people attempting to enter said secured area if said tailgating confidence level meets a threshold value and (iii) exclude said person in said number of people attempting to enter said secured area if said tailgating confidence level does not meet said threshold value and (b) said tailgating confidence level is (i) increased in response to determining that said direction of travel is towards said secured area, (ii) decreased in response to determining that said direction of travel is not towards said secured area, (iii) increased in response to said comparison of said number of pixels measured between said person and said second person being less than a distance threshold and (iv) decreased in response to said comparison of said number of pixels measured between said person and said second person being greater than said distance threshold.

* * * * *